US012779327B2

(12) United States Patent
He et al.

(10) Patent No.: US 12,779,327 B2
(45) Date of Patent: Nov. 3, 2026

(54) RENDERING METHOD AND APPARATUS FOR VIRTUAL SCENE, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Jiaxun He, Shenzhen (CN); Dejia Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 269 days.

(21) Appl. No.: 18/378,066

(22) Filed: Oct. 9, 2023

(65) Prior Publication Data

US 2024/0033625 A1 Feb. 1, 2024

Related U.S. Application Data

(63) Continuation of application No. PCT/CN2022/135314, filed on Nov. 30, 2022.

(30) Foreign Application Priority Data

Mar. 11, 2022 (CN) ......................... 202210239108.0

(51) Int. Cl.
*A63F 13/52* (2014.01)
*G06T 7/73* (2017.01)
(Continued)

(52) U.S. Cl.
CPC ................ *A63F 13/52* (2014.09); *G06T 7/73* (2017.01); *G06T 13/20* (2013.01); *G06T 15/005* (2013.01);
(Continued)

(58) Field of Classification Search
CPC . A63F 13/52; G06T 7/73; G06T 13/20; G06T 15/005; G06T 19/20; G06T 2210/56; G06T 2219/2016; G06T 3/00
See application file for complete search history.

(56) References Cited

U.S. PATENT DOCUMENTS 5,920,492 A * 7/1999 Montag .................. G06T 15/00 434/226
6,600,491 B1 * 7/2003 Szeliski ................. G06T 13/80 348/700
(Continued)

FOREIGN PATENT DOCUMENTS

CN 101706830 A 5/2010
CN 103559730 A 2/2014
(Continued)

OTHER PUBLICATIONS

Tencent Technology, ISR, PCT/ CN2022/135314, Feb. 22, 2023, 3 pgs.

*Primary Examiner* — Kent W Chang
*Assistant Examiner* — Karl Duc Truong
(74) *Attorney, Agent, or Firm* — Morgan, Lewis & Bockius LLP

(57) ABSTRACT

This application provides a rendering method performed by an electronic device. The method includes: sampling an animation of a target three-dimensional element in the virtual scene to obtain a mesh sequence frame corresponding to the animation of the target three-dimensional element, the animation of the target three-dimensional element comprising a current frame and at least one historical frame, and each historical frame comprising the target three-dimensional element; obtaining mesh data corresponding to the target three-dimensional element from the mesh sequence frame; creating a transformed two-dimensional element corresponding to the target three-dimensional element through
(Continued)

transforming the mesh data corresponding to the target three-dimensional element; and rendering the transformed two-dimensional element corresponding to the target three-dimensional element.

21 Claims, 16 Drawing Sheets

(51) Int. Cl.
*G06T 13/20* (2011.01)
*G06T 15/00* (2011.01)
*G06T 19/20* (2011.01)

(52) U.S. Cl.
CPC .......... *G06T 19/20* (2013.01); *G06T 2210/56* (2013.01); *G06T 2219/2016* (2013.01)

(56) References Cited

U.S. PATENT DOCUMENTS 7,944,443 B1 * 5/2011 Milliron .................. G06T 15/00 345/473
9,734,615 B1 * 8/2017 Knoll ...................... G06T 13/20
10,796,489 B1 * 10/2020 Cordes .................. A63F 13/213
2008/0170079 A1 * 7/2008 Ramshaw ............. G06T 15/005 345/501
2008/0181486 A1 * 7/2008 Spooner .................... G06T 7/55 382/154
2011/0181606 A1 * 7/2011 Sumner ................... G06T 13/00 345/474
2011/0306417 A1 * 12/2011 Sheblak .................. A63F 13/52 463/32
2013/0120418 A1 * 5/2013 Green ....................... G06T 1/00 345/522
2015/0084949 A1 3/2015 Venkatesh et al.
2018/0253884 A1 * 9/2018 Burnett, III .......... H04N 13/351
2018/0276870 A1 * 9/2018 Redkey ................... G06T 17/20
2018/0302603 A1 10/2018 Tanaka
2018/0357810 A1 * 12/2018 Young ................... G06T 15/005
2019/0156546 A1 * 5/2019 Zhang ..................... A63F 13/55
2019/0304068 A1 * 10/2019 Vogels ...................... G06T 5/50
2019/0377672 A1 * 12/2019 Ante ....................... A63F 13/77
2020/0126299 A1 * 4/2020 Bosch ..................... G06T 13/20
2020/0272825 A1 * 8/2020 Zhang .................... G06N 3/045
2021/0011697 A1 * 1/2021 Udayakumaran ......... G06F 8/71
2021/0335039 A1 * 10/2021 Jones ...................... G06T 19/20
2022/0176245 A1 * 6/2022 Lewin ..................... A63F 13/52

FOREIGN PATENT DOCUMENTS

CN 106204704 A 12/2016
CN 108243629 A 7/2018
CN 108479067 A 9/2018
CN 109345616 A 2/2019
CN 111260762 A * 1/2020
CN 112396689 A 2/2021

* cited by examiner

| Overview | Total | Self | Calls | GC Alloc | Time ms | Self ms |
|---|---|---|---|---|---|---|
| ▼ PostLateUpdate,PlayerUpdateCanvases | 62.1% | 2.7% | 1 | 0 B | 1.58 | 0.07 |
| ▼ Canvas,SendWillRenderCanvases() | 58.3% | 7.5% | 1 | 0 B | 1.49 | 0.19 |
| ▷ -----combine mesh----- | 36.3% | 15.1% | 14 | 0 B | 0.92 | 0.38 |
| ▷ -----bake mesh----- | 14.4% | 10.3% | 14 | 0 B | 0.36 | 0.26 |
| Canvas,BuildBatch | 0.8% | 0.8% | 1 | 0 B | 0.02 | 0.02 |

FIG. 4F

| Overview | Total | Self | Calls | GC Alloc | Time ms | Self ms |
|---|---|---|---|---|---|---|
| Overhead | 36.2% | 36.2% | 1 | 0 B | 0.83 | 0.83 |
| ▼ PostLateUpdate,PlayerUpdateCanvases | 29.9% | 2.8% | 1 | 0 B | 0.68 | 0.06 |
| ▼ Canvas,SendWillRenderCanvases() | 25.6% | 7.6% | 1 | 0 B | 0.58 | 0.17 |
| ▷ -----bake mesh----- | 16.9% | 12.2% | 14 | 0 B | 0.38 | 0.28 |
| ▷ -----combine mesh----- | 0.9% | 0.9% | 14 | 0 B | 0.02 | 0.02 |

FIG. 4G

RENDERING METHOD AND APPARATUS FOR VIRTUAL SCENE, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/135314, entitled "RENDERING METHOD AND APPARATUS FOR VIRTUAL SCENE, ELECTRONIC DEVICE, COMPUTER-READABLE STORAGE MEDIUM, AND COMPUTER PROGRAM PRODUCT" filed on Nov. 30, 2022, which is based upon and claims priority to Chinese Patent Application No. 202210239108.0, entitled "RENDERING METHOD AND APPARATUS FOR VIRTUAL SCENE, ELECTRONIC DEVICE, COMPUTER-READABLE STORAGE MEDIUM, AND COMPUTER PROGRAM PRODUCT" filed on Mar. 11, 2022, all of which is incorporated by reference in its entirety.

FIELD OF THE TECHNOLOGY

This application relates to the technical field of computers, and in particular, to a rendering method and apparatus for a virtual scene, an electronic device, a computer-readable storage medium, and a computer program product.

BACKGROUND OF THE DISCLOSURE

With the development of game engine technologies, the game engine provides various tools for game designers to write games, to enable the game designers to make game programs easily and quickly. In the process of game screen rendering, mixed rendering is usually performed on two-dimensional elements and three-dimensional elements in the game screen.

In the related art, because the two-dimensional elements and the three-dimensional elements are in different rendering systems in the game engine, the two-dimensional elements and the three-dimensional elements cannot be adapted effectively during mixed rendering, leading to a poor rendering effect.

For how to effectively improve the mixed rendering effect of the two-dimensional elements and the three-dimensional elements, there is no effective solution in the related art.

SUMMARY

Embodiments of this application provide a rendering method and apparatus for a virtual scene, an electronic device, a computer-readable storage medium, and a computer program product, which can implement the unification of the rendering modes of target three-dimensional elements and target two-dimensional elements, to retain the rendering effect of the target three-dimensional elements, thereby effectively improving the mixed rendering effect of the two-dimensional elements and the three-dimensional elements.

Technical solutions in the embodiments of this application are implemented as follows:

An embodiment of this application provides a method for rendering a virtual scene, performed by an electronic device, the method including:

scene;

sampling an animation of a target three-dimensional element in the virtual scene to obtain a mesh sequence frame corresponding to the animation of the target three-dimensional element, the animation of the target three-dimensional element comprising a current frame and at least one historical frame, and each historical frame comprising the target three-dimensional element;

obtaining mesh data corresponding to the target three-dimensional element from the mesh sequence frame;

creating a transformed two-dimensional element corresponding to the target three-dimensional element through transforming the mesh data corresponding to the target three-dimensional element; and rendering the transformed two-dimensional element corresponding to the target three-dimensional element.

An embodiment of this application provides an electronic device, including:

a memory, configured to store executable instructions;

a processor, configured to execute the executable instructions and cause the electronic device to implement the method for rendering a virtual scene provided by the embodiments of this application when executing the executable instructions stored in the memory.

An embodiment of this application provides a non-transitory computer-readable storage medium, storing executable instructions that, when executed by a processor of an electronic device, causing the electronic device to implement the method for rendering a virtual scene provided by the embodiments of this application when executed by a processor.

The embodiments of this application have the following beneficial effects:

Mesh data corresponding to target three-dimensional elements is transformed, and then transformed two-dimensional elements corresponding to the target three-dimensional elements are created according to the transformed mesh data, thereby implementing the transformation of the target three-dimensional elements, and further rendering the target two-dimensional elements and the transformed two-dimensional elements. In this way, the target three-dimensional elements are transformed to obtain the transformed two-dimensional elements, and the transformed two-dimensional elements and the target two-dimensional elements are rendered to implement the effective adaptation between the target two-dimensional elements and the target three-dimensional elements, and implement the unification of the rendering modes of the target three-dimensional elements and the target two-dimensional elements, to retain the rendering effect of the target three-dimensional elements, thereby effectively improving the mixed rendering effect of the two-dimensional elements and the three-dimensional elements.

BRIEF DESCRIPTION OF THE DRAWINGS

FIG. 4D to FIG. 4G are schematic principle diagrams of a method for rendering a virtual scene according to an embodiment of this application.

DESCRIPTION OF EMBODIMENTS

Figure 1:
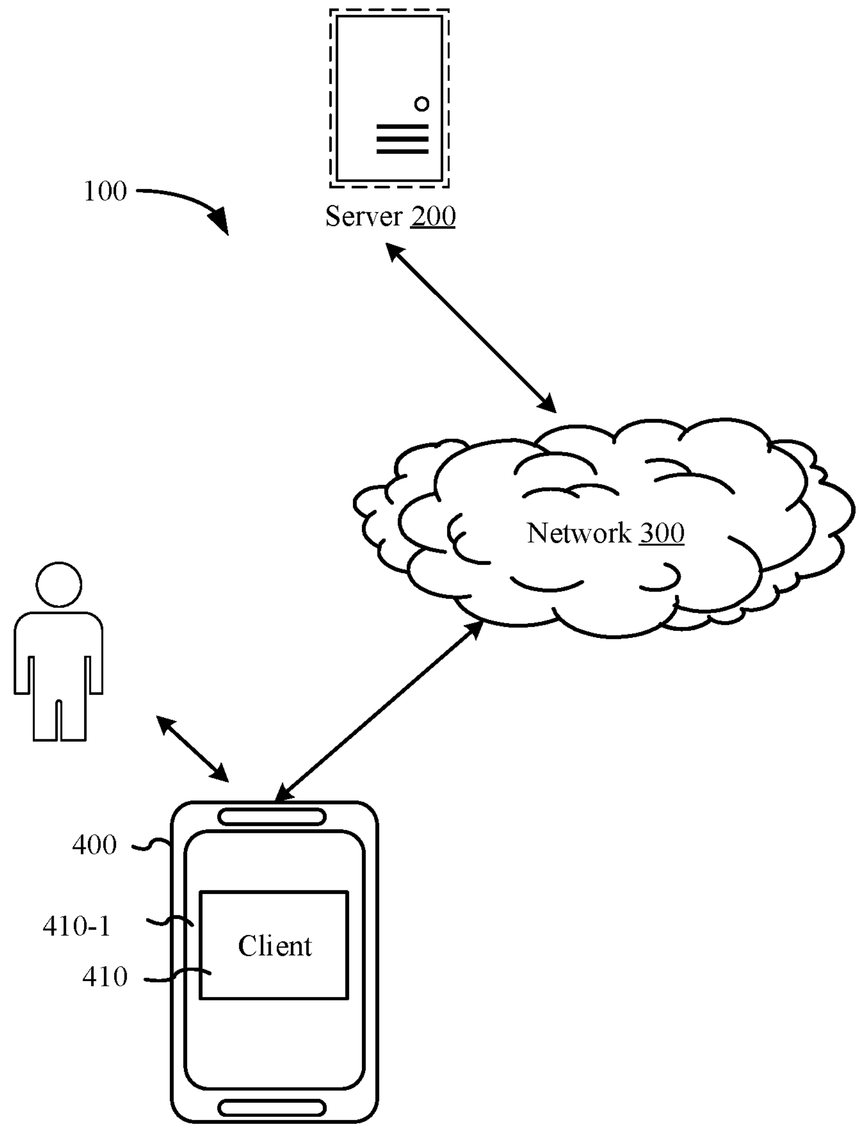
FIG. 1 is a schematic architectural diagram of a rendering system 100 for a virtual scene according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term “some embodiments” describes subsets of all possible embodiments, but it can be understood that “some embodiments” may be the same subset or different subsets of all the possible embodiments, and can be combined with each other without conflict.

In the following description, the term “first/second/third” is merely for distinguishing similar objects and does not represent a particular order for objects. It can be understood that “first/second/third” is interchangeable in a particular order or prior order when permitted, so that the embodiments of this application described herein can be implemented in an order other than that illustrated or described herein.

Unless otherwise defined, meanings of all technical and scientific terms used in this specification are the same as those usually understood by a person skilled in the art to which this application belongs. The terms used in this specification are merely for the purpose of describing the embodiments of this application but are not intended to limit this application.

Before the embodiments of this application are further described in detail, a description is made on nouns and terms in the embodiments of this application, and the nouns and terms in the embodiments of this application are applicable to the following explanations.

1) Games: Also known as video games, which refer to all interactive games that run on electronic device platforms. According to different running media, games are classified into five categories: console games (in a narrow sense, only refers to home games herein), handheld games, arcade games, computer games, and mobile phone games.

2) Game engine: Core component of some programmed editable computer game systems or some interactive real-time image applications. These systems provide game designers with various tools required for writing games, to make the game designers easily and quickly make game programs without starting from scratch. Most support multiple operating platforms, such as Linux, Mac OS X, and Microsoft Windows. The game engine includes the following systems: rendering engine (that is, “renderer”, including two-dimensional image engine and three-dimensional image engine), physical engine, collision detection system, sound effect, script engine, computer animation, artificial intelligence, network engine, and scene management.

3) Elements: The container of all components, including two-dimensional elements and three-dimensional elements. All game objects in the game are elements in essence, and the game objects themselves do not add any feature to the game, but are containers containing components for achieving actual functions.

4) Game engine editor: Including scene editor, particle effects editor, model browser, animation editor, and material editor. Scene editor is used to place model objects, light sources, cameras, and the like. Particle effects editor is used to make various game special effects. Animation editor is used to edit animation functions, and can trigger some events in game logic. Material editor is used to edit model effects.

5) Human Machine Interaction (HMI) interface: Also known as user interface, which is the medium and dialogue interface for transmitting and exchanging information between people and computers, and is an important part of computer system. It is the medium for interaction and information exchange between system and users, and it implements the transformation between the internal form of information and the acceptable form of human beings. Human-machine interface exists in all fields involved in human-machine information exchange.

6) Three-dimensional elements: Elements in a rendering engine that are in a three-dimensional rendering system. Three-dimensional elements include particle three-dimensional elements, static three-dimensional elements, and skinned three-dimensional elements.

7) Two-dimensional elements: Elements in two-dimensional rendering system in rendering engine. Two-dimensional elements may be various controls on object-oriented programming platform, and the base class of each two-dimensional element is Graphic.

8) Skinned three-dimensional elements (Skinned Mesh): Three-dimensional elements used to make skinned animation, that is, to add animation special effects to vertices on geometry. Skinned three-dimensional elements are meshes with skeleton and bones.

9) Particle three-dimensional elements (Particle System): Three-dimensional elements used to create special effects in rendering engine, and simulate the movement of particles through internal physical system.

10) Mask component (Mask): A component in game engine, which can clip and display two-dimensional elements. The mask component is used to specify the rendering range of child nodes. The node with the mask component use the constraint box of the node to create a rendering mask. All nodes of the node clip according to this mask, and two-dimensional elements outside the mask range will not be rendered.

11) Grouping component (Canvas Group): A component in game engine, which is used to group and control two-dimensional elements uniformly.

12) Adaptation component: A component in game engine, which is used to group and control two-dimensional elements uniformly.

13) Element rendering component (Canvas Renderer): A renderer component in game engine responsible for rendering two-dimensional elements.
14) Object data (Transform): Data that represents the position, rotation, and scaling of an element in game engine.
15) Original coordinate system (Local Space): A coordinate system with the axis of the element itself as the origin.
16) Canvas coordinate system (World Space): A coordinate system with the center of the target canvas as the origin.

In the process of implementing the embodiments of this application, the applicant finds that the related art has the following problems:

In the rendering system of the game engine, there is often a scenario of mixed rendering of three-dimensional elements and two-dimensional elements. Because the three-dimensional elements and the two-dimensional elements are in different rendering systems in the game engine, there are many problems in the mixed rendering of the two-dimensional elements and the three-dimensional elements in the related art. For example, level control cannot be effectively performed on the three-dimensional elements and the two-dimensional elements, the rendering sequence between two-dimensional elements and three-dimensional elements cannot be effectively controlled, the complex scenario of mixed use of the two-dimensional elements and the three-dimensional elements cannot be supported, and the native functional components of the three-dimensional elements and the two-dimensional elements are incompatible, making it impossible for the two-dimensional elements and the three-dimensional elements to be incompatible with functions such as adaptation and typesetting.

For the problems existing in the related art, in the embodiments of this application, the three-dimensional elements are transformed into transformed two-dimensional elements, and then the transformed two-dimensional elements and the target two-dimensional elements are rendered, to implement the mixed rendering of the two-dimensional elements and the three-dimensional elements and ensure that the rendering effect of the three-dimensional elements is not affected, thereby effectively improving the mixed rendering effect of the two-dimensional elements and the three-dimensional elements. At the same time, the processing time of the central processing unit (CPU) can effectively be reduced, thereby improving the processing efficiency. A detailed description is provided below.

Figure 5A:
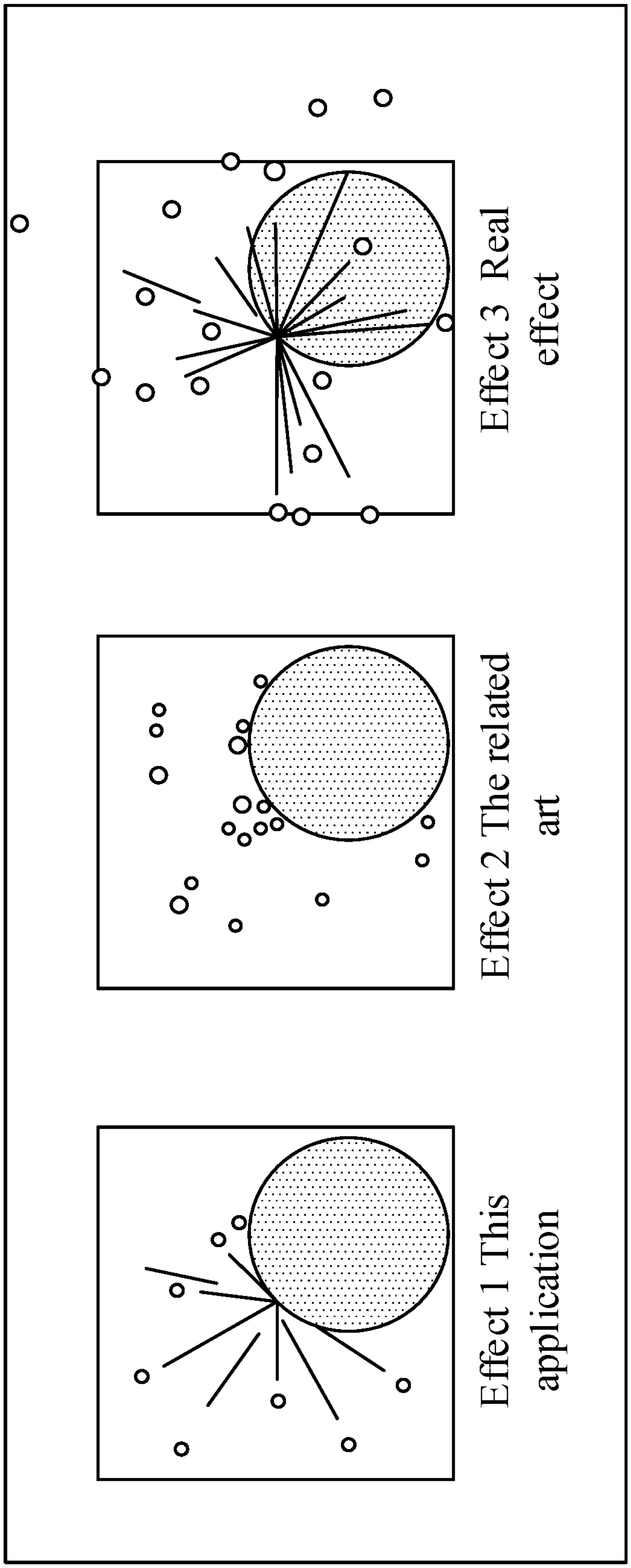
FIG. 5A is a schematic effect diagram of a method for rendering a virtual scene according to an embodiment of this application.

FIG. 5A is a schematic effect diagram of a method for rendering a virtual scene according to an embodiment of this application. An effect 1 is the effect of mixed rendering of two-dimensional elements and three-dimensional elements using the method for rendering a virtual scene provided in this embodiment of this application, an effect 2 is the effect of mixed rendering of two-dimensional elements and three-dimensional elements in the related art, and an effect 3 is the real effect. The similarity degree of the effect 1 to the effect 3 is better than the similarity degree of the effect 2 to the effect 3. That is, the method for rendering a virtual scene provided in this embodiment of this application can effectively improve the mixed rendering effect of the two-dimensional elements and the three-dimensional elements.

Figure 5B:
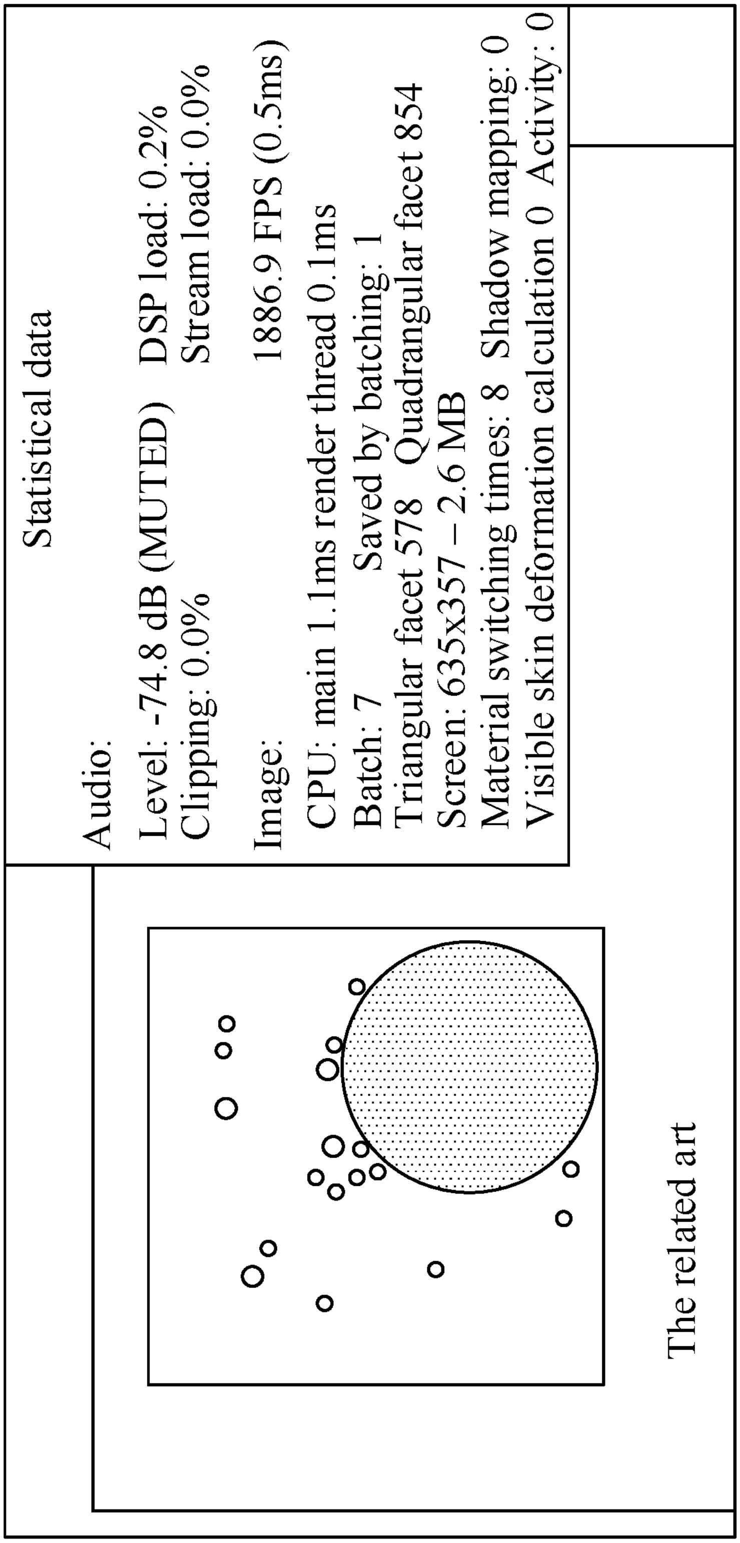
FIG. 5B is a schematic effect diagram according to the related art.
Figure 5C:
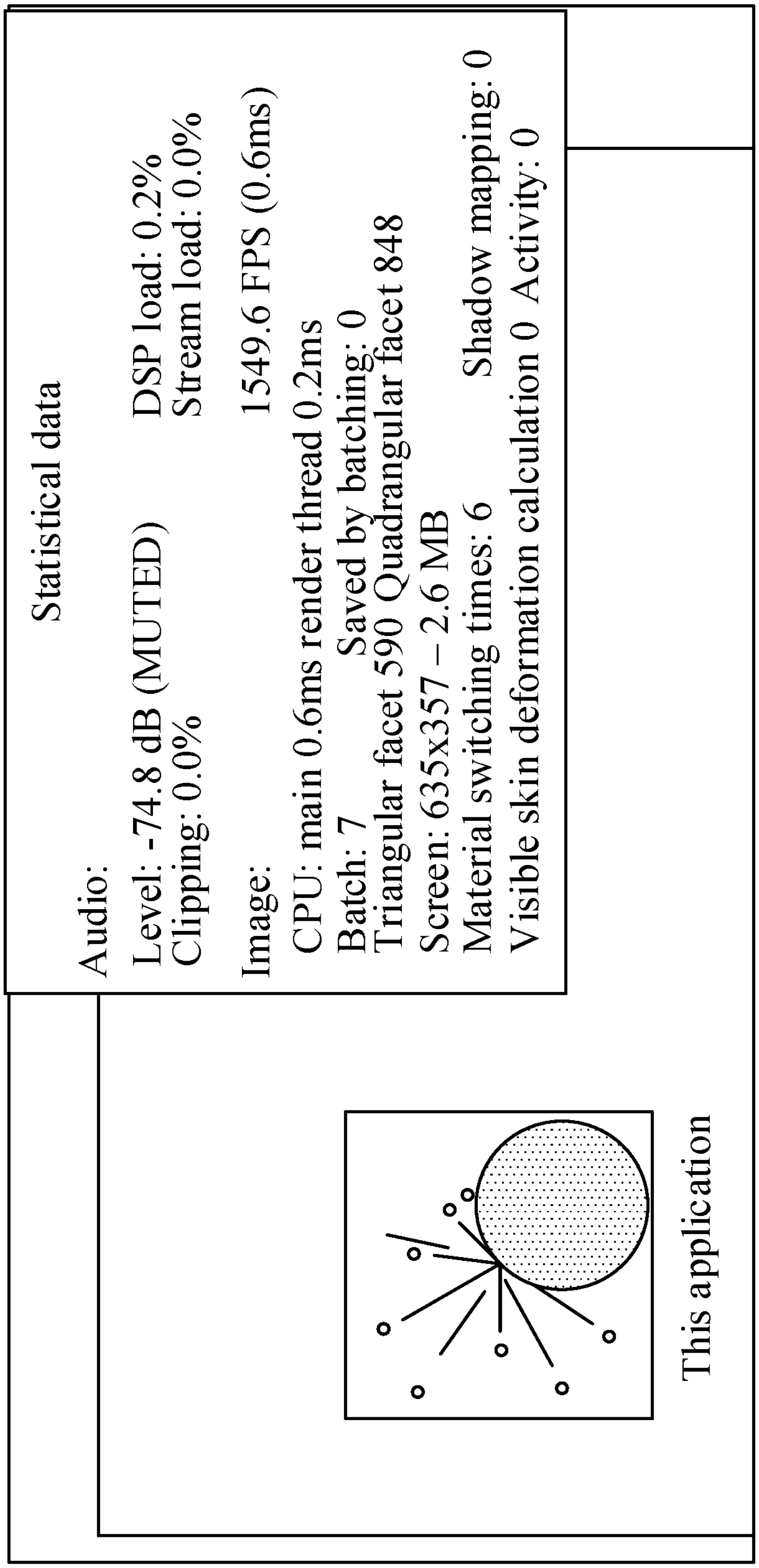
FIG. 5C is a schematic effect diagram of a method for rendering a virtual scene according to an embodiment of this application.

FIG. 5B is a schematic effect diagram according to the related art. In the related art, the processing time of the central processing unit is 1.1 ms, and the rendering batch is 7. FIG. 5C is a schematic effect diagram of a method for rendering a virtual scene according to an embodiment of this application. In this embodiment of this application, the processing time of the central processing unit is 0.6 ms, and the rendering batch is 7. Therefore, the method for rendering a virtual scene provided in this embodiment of this application can effectively reduce the processing time of the central processing unit, thereby improving the processing efficiency.

The embodiments of this application provide a rendering method and apparatus for a virtual scene, an electronic device, a non-transitory computer-readable storage medium, and a computer program product, which can implement the unification of the rendering modes of target three-dimensional elements and target two-dimensional elements, to retain the rendering effect of the target three-dimensional elements, thereby effectively improving the mixed rendering effect of the two-dimensional elements and the three-dimensional elements. The following describes the exemplary application of the electronic device provided in the embodiments of this application. The electronic device provided in the embodiments of this application may be implemented as various types of user terminals such as notebook computer, tablet computer, desktop computer, set-top box, mobile device (for example, mobile phone, portable music player, personal digital assistant, and special message device, or portable game device), or may be implemented as a server.

FIG. 1 is a schematic architectural diagram of a rendering system 100 for a virtual scene according to an embodiment of this application. In order to implement an application scenario of rendering a virtual scene (for example, mixed rendering on two-dimensional elements and three-dimensional elements in a game engine). A terminal device 400 is connected to a server 200 through a network 300, and the network 300 may be a wide area network or a local area network, or a combination of thereof.

The terminal device 400 is for a user to use a client 410 and is displayed in a graphical interface 410-1. The terminal device 400 and the server 200 are connected to each other through a wired or wireless network.

In some embodiments, the server 200 may be an independent physical server, a server cluster or a distributed system including a plurality of physical servers, or a cloud server that provides basic cloud computing services such as cloud service, cloud database, cloud computing, cloud function, cloud storage, network services, cloud communication, middleware service, domain name service, security service, content delivery network (CDN), and big data and artificial intelligence platform. The terminal device 400 may be a smartphone, a tablet computer, a notebook computer, a desktop computer, a smart speaker, a smart watch, a smart voice interaction device, a smart home appliance, a vehicle terminal, or the like, but is not limited thereto. The terminal and the server may be connected directly or indirectly in a wired or wireless communication mode, which is not limited in the embodiments of this application.

In some embodiments, the client 410 of the terminal device 400 obtains target three-dimensional elements and target two-dimensional elements, and transmits the target three-dimensional elements to the server 200 through the network 300. The server 200 determines transformed two-dimensional elements corresponding to the target three-dimensional elements based on the target three-dimensional elements, and transmits the transformed two-dimensional elements to the terminal device 400. The terminal device 400 renders the transformed two-dimensional elements and the target two-dimensional elements and displays them in the graphical interface 410-1.

In some other embodiments, the client 410 of the terminal device 400 obtains target three-dimensional elements and target two-dimensional elements, and determines transformed two-dimensional elements corresponding to the target three-dimensional elements based on the target three-dimensional elements. The terminal device 400 renders the transformed two-dimensional elements and the target two-dimensional elements and displays them in the graphical interface 410-1.

Figure 2:
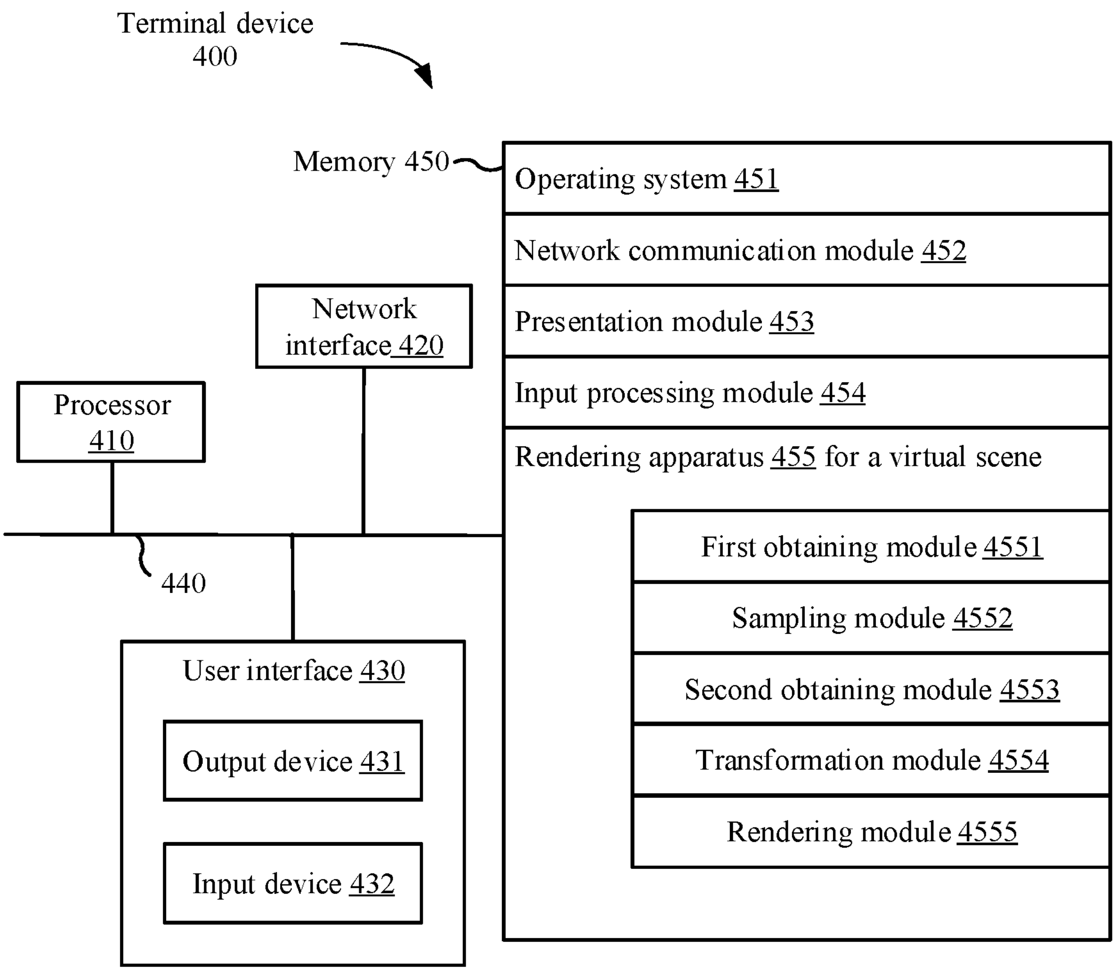
FIG. 2 is a schematic structural diagram of a terminal device 400 according to an embodiment of this application.

In some embodiments, FIG. 2 is a schematic structural diagram of a terminal device 400 according to an embodiment of this application. The terminal device 400 shown in FIG. 2 includes: at least one processor 410, a memory 450, at least one network interface 420, and a user interface 430. The components in the terminal device 400 are coupled together by a bus system 440. It can be understood that, the bus system 440 is configured to implement connection and communication between the components. In addition to a data bus, the bus system 440 further includes a power bus, a control bus, and a state signal bus. But, for ease of clear description, all types of buses in FIG. 2 are marked as the bus system 440.

The processor 410 may be an integrated circuit chip with signal processing capabilities, such as a general purpose processor, a digital signal processor (DSP), or other programmable logic devices, discrete gate or transistor logic devices, discrete hardware components, and the like. The general purpose processor may be a microprocessor or any conventional processor.

The user interface 430 includes one or more output devices 431 that can present media content, including one or more speakers and/or one or more visual displays. The user interface 430 further includes one or more input devices 432, including user interface components that facilitate user input, such as keyboard, mouse, microphone, touchscreen display, camera, and other input buttons and controls.

The memory 450 may be a removable memory, a non-removable memory, or a combination thereof. Exemplary hardware devices include solid-state memory, hard disk drive, optical disk drive, and the like. The memory 450 includes one or more storage devices that are physically located remotely from the processor 410.

The memory 450 includes a volatile memory or a non-volatile memory, or may include both a volatile memory and a non-volatile memory. The non-volatile memory may be a read-only memory (ROM), and the volatile memory may be a random access memory (RAM). The memory 450 described in the embodiments of this application includes but is not limited to any memory of suitable type.

In some embodiments, the memory 450 can store data to support various operations, and examples of the data include programs, modules, and data structures, or subsets or supersets thereof, as illustrated below.

An operating system 451 includes system programs for processing various basic system services and performing hardware-related tasks, such as a framework layer, a core library layer, and a driver layer, for implementing various basic services and processing hardware-based tasks.

A network communication module 452 is configured to reach other computer devices through one or more (wired or wireless) network interfaces 420. An exemplary network interface 420 includes: Bluetooth, Wireless Compatibility Authentication (WiFi), or Universal Serial Bus (USB).

A presentation module 453 is configured to present information (for example, a user interface for operating peripherals and displaying content and information) through one or more output devices 431 (for example, a display screen or a speaker) associated with the user interface 430.

An input processing module 454 is configured to detect one or more user inputs or interactions from one of the one or more input devices 432 and to translate the detected inputs or interactions.

In some embodiments, the rendering apparatus for a virtual scene provided in the embodiments of this application may be implemented in a software manner. FIG. 2 shows the rendering apparatus 455 for a virtual scene stored in the memory 450, which may be software in the form of programs and plug-ins, including the following software modules: a first obtaining module 4551, a sampling module 4552, a second obtaining module 4553, a transformation module 4554, and a rendering module 4555. These modules are logical and therefore can be arbitrarily combined or further split according to the implemented functions. The functions of the modules are described below.

The method for rendering a virtual scene provided in the embodiments of this application is described below with reference to the exemplary application and implementation of the terminal device provided in the embodiments of this application.

Figure 3A:
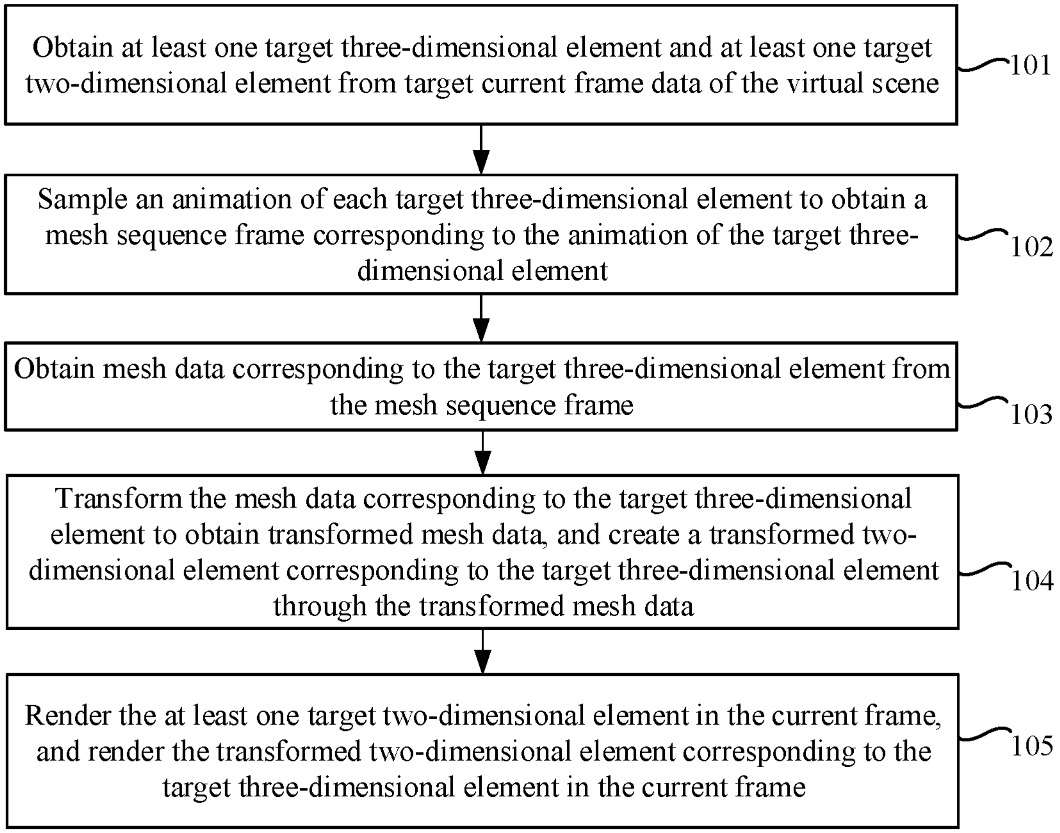
FIG. 3A to FIG. 3E are schematic flowcharts of a method for rendering a virtual scene according to an embodiment of this application.

FIG. 3A is a schematic flowchart of a method for rendering a virtual scene according to an embodiment of this application. Descriptions are provided in combination with step 101 to step 105 shown in FIG. 3A, and the execution body of the following step 101 to step 105 may be the above server or terminal device.

Step 101. Obtain at least one target three-dimensional element and at least one target two-dimensional element from target current frame data of the virtual scene.

Figure 4A:
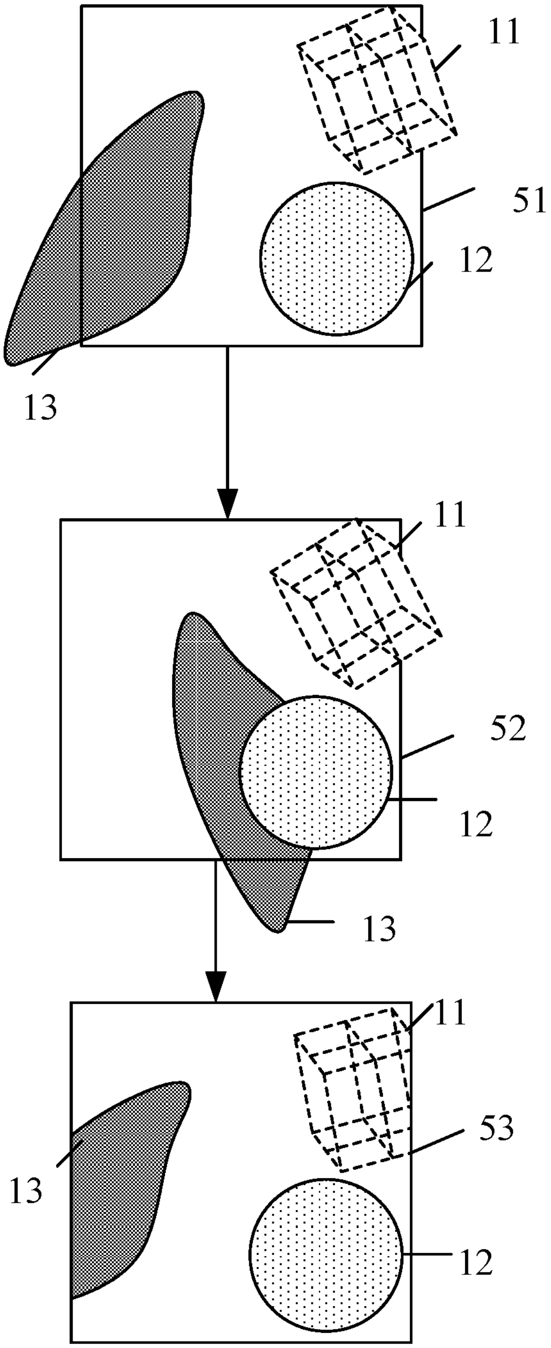
FIG. 4A is a schematic block diagram of a method for rendering a virtual scene according to an embodiment of this application.

As an example, FIG. 4A is a schematic block diagram of a method for rendering a virtual scene according to an embodiment of this application. When a target current frame of a virtual scene is a sampling frame 53, at least one target three-dimensional element and at least one target two-dimensional element may be obtained from frame data of the sampling frame 53, The target three-dimensional element may be a three-dimensional element 11, and the target two-dimensional element may be a two-dimensional element 12 and a two-dimensional element 13.

Step 102. Sample an animation of each target three-dimensional element to obtain a mesh sequence frame corresponding to the animation of the target three-dimensional element.

Herein, the animation of the target three-dimensional element includes a current frame and at least one historical frame, each historical frame includes the target three-dimensional element (for example, a three-dimensional game character), and the mesh sequence frame refers to a sampling frame including the target three-dimensional element among a plurality of sampling frames obtained by sampling the animation.

As an example, referring to FIG. 4A, the animation of the target three-dimensional element includes a current frame 53, a historical frame 51, and a historical frame 52. Using the three-dimensional element 11 as an example, by sampling an animation of the three-dimensional element 11, a plurality of mesh sequence frames, for example, a historical frame 51, a historical frame 52, and a current frame 53, corresponding to the animation of the three-dimensional element 11 can be obtained.

Figure 3B:
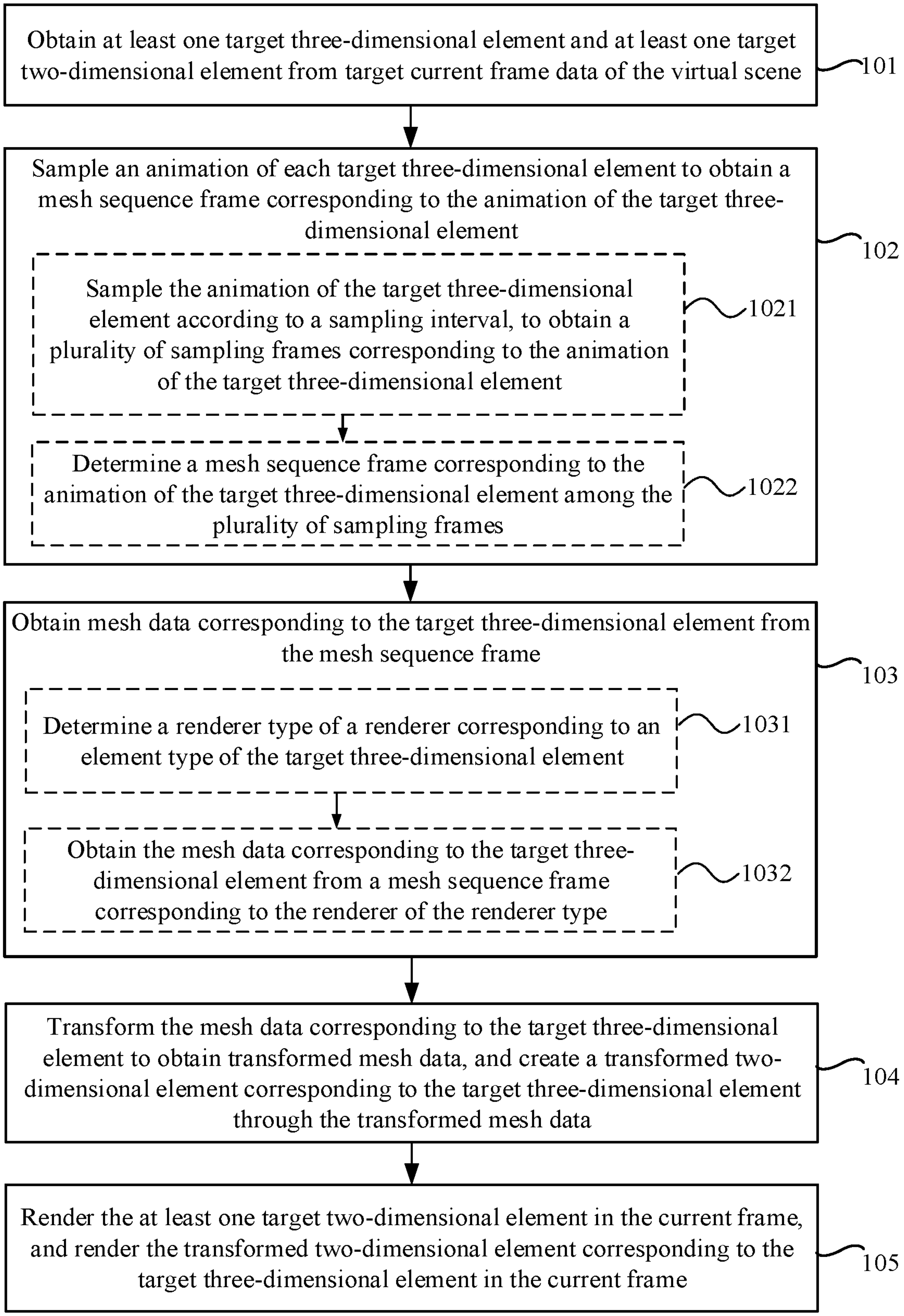

In some embodiments, FIG. 3B is a schematic flowchart of a method for rendering a virtual scene according to an embodiment of this application. Step 102 shown in FIG. 3A may be implemented by performing step 1021 to step 1022 shown in FIG. 3B for any one target three-dimensional element. Descriptions are provided below respectively.

Step 1021. Sample the animation of the target three-dimensional element according to a sampling interval, to obtain a plurality of sampling frames corresponding to the animation of the target three-dimensional element.

Herein, the number of sampling frames may be negatively correlated with the duration of the sampling interval, that is, a longer duration of the sampling interval indicates less sampling frames.

In some embodiments, the sampling interval is a time interval between any two adjacent sampling points. A longer sampling interval indicates less sampling frames obtained, and a shorter sampling interval indicates more sampling frames obtained.

As an example, referring to FIG. 4A, the sampling interval may be 1 ms, and the animation of the three-dimensional element 11 is sampled according to the sampling interval of 1 ms to obtain a sampling frame 51, a sampling frame 52, and a sampling frame 53 corresponding to the animation of the three-dimensional element 11.

Step 1022. Determine a mesh sequence frame corresponding to the animation of the target three-dimensional element among the plurality of sampling frames.

Herein, the mesh sequence frame is a sampling frame including the target three-dimensional element among a plurality of sampling frames.

As an example, referring to FIG. 4A, if the sampling frame 51, the sampling frame 52, and the sampling frame 53 all include the three-dimensional element 11, the sampling frame 51, the sampling frame 52, and the sampling frame 53 are all mesh sequence frames. When a sampling frame among a plurality of sampling frames does not include the target three-dimensional element (for example, a three-dimensional game character), the corresponding sampling frame (that is, the sampling frame not including the target three-dimensional element) is not a mesh sequence frame. For example, the plurality of sampling frames are five sampling frames, and assuming that the five sampling frames are respectively a sampling frame 1, a sampling frame 2, a sampling frame 3, a sampling frame 4, and a sampling frame 5, where the sampling frame 2 does not include the target three-dimensional element, the sampling frame 2 is not a mesh sequence frame That is, only the sampling frame 1, the sampling frame 3, the sampling frame 4, and the sampling frame 5 are determined as mesh sequence frames.

In some embodiments, the above step 1022 may be implemented in the following manner: (i) determining a start playing time and an end playing time of the target three-dimensional element in the animation of the target three-dimensional element; and (ii) determining the mesh sequence frame corresponding to the animation of the target three-dimensional element among the plurality of sampling frames based on the start playing time and the end playing time.

As an example, the start playing time and the end playing time of the target three-dimensional element are determined in the animation of the target three-dimensional element. For example, if the total playing time of the animation of the target three-dimensional element is 10 minutes, from the beginning of playing the animation, when the target three-dimensional element appears in the animation at the second minute, the start playing time of the target three-dimensional element is the second minute, and when the target three-dimensional element disappears from the animation at the ninth minute and the tenth second, the end playing time of the target three-dimensional element is the ninth minute and the tenth second.

In this way, by determining the time moment when the target three-dimensional element appears and disappears in the animation, the start playing time and the end playing time of the target three-dimensional element are determined, thereby facilitating the subsequent accurate determination of the mesh sequence frame according to the start playing time and the end playing time.

In some embodiments, the determining the mesh sequence frame corresponding to the animation of the target three-dimensional element among the plurality of sampling frames based on the start playing time and the end playing time may be implemented in the following manner: determining, when the start playing time and the end playing time are the same, one sampling frame among the plurality of sampling frames as the mesh sequence frame corresponding to the animation; and determining, when the start playing time and the end playing time are different, at least two sampling frames between the start playing time and the end playing time among the plurality of sampling frames as the mesh sequence frame corresponding to the animation.

As an example, when the start playing time and the end playing time are the same, the target three-dimensional element disappears from the animation immediately after the target three-dimensional element appears in the animation, that is, the target three-dimensional element flashes in the animation of the target three-dimensional element, and one sampling frame among the plurality of sampling frames is determined as the mesh sequence frame corresponding to the animation.

As an example, when the start playing time and the end playing time are different, for example, the start playing time of the target three-dimensional element is the second minute, and the end playing time of the target three-dimensional element is the ninth minute and the tenth second, at least two sampling frames between the second minute and the ninth minute and the tenth second among the plurality of sampling frames are determined as the mesh sequence frames corresponding to the animation.

Step 103. Obtain mesh data corresponding to the target three-dimensional element from the mesh sequence frame.

Herein, different target three-dimensional elements correspond to different coordinate systems of the mesh data.

In some embodiments, the target three-dimensional element includes a skinned three-dimensional element, a particle three-dimensional element, and a static three-dimensional element, where the skinned three-dimensional element, the particle three-dimensional element, and the static three-dimensional element correspond to different coordinate systems of the mesh data.

In some embodiments, FIG. 3B is a schematic flowchart of a method for rendering a virtual scene according to an embodiment of this application. Step 103 shown in FIG. 3A may be implemented by performing step 1031 to step 1032 shown in FIG. 3B for any one target three-dimensional element. Descriptions are provided below respectively.

Step 1031. Determine a renderer type of a renderer corresponding to an element type of the target three-dimensional element.

In some embodiments, when the element type of the target three-dimensional element is a skinned three-dimensional element, the renderer type of the corresponding renderer is a skinned renderer, where the skinned renderer is used for rendering the skinned three-dimensional element. When the element type of the target three-dimensional element is a particle three-dimensional element, the renderer type of the corresponding renderer is a particle renderer, where the particle renderer includes a renderer run by a central processing unit and a renderer run by a graphics processing unit, and the particle renderer is used for rendering the particle three-dimensional element. When the element type of the target three-dimensional element is a static three-dimensional element, the renderer type of the corresponding renderer is a mesh renderer, where the mesh renderer is used for rendering the static three-dimensional element.

Step 1032. Obtain the mesh data corresponding to the target three-dimensional element from a mesh sequence frame corresponding to the renderer of the renderer type.

In some embodiments, when the element type of the target three-dimensional element is a skinned three-dimensional element, the above step 1032 may be implemented by performing the following processing for the skinned three-dimensional element: obtaining mesh data corresponding to the skinned three-dimensional element from a mesh sequence frame corresponding to a skinned renderer, where the mesh data corresponding to the skinned three-dimensional element includes translation data, rotation data and scaling data, a coordinate system of the translation data and the rotation data uses a position of the skinned three-dimensional element as an origin, and a coordinate system of the scaling data uses a center point of a target canvas as an origin.

In some embodiments, the translation data characterizes translation characteristics of the skinned three-dimensional element. For example, the translation characteristics may be the translation of the skinned three-dimensional element from position A at one time to position B at another time. The rotation data characterizes rotation characteristics of the skinned three-dimensional element. For example, the rotation characteristics may be the rotation of the skinned three-dimensional element from posture A at one time to posture B at another time. The scaling data characterizes scaling characteristics of the skinned three-dimensional element. For example, the scaling characteristics may be the scaling of the skinned three-dimensional element from dimension A at one time to dimension B at another time.

In this way, by obtaining the mesh data corresponding to the skinned three-dimensional element from the mesh sequence frame corresponding to the skinned renderer, the accuracy of the obtained mesh data corresponding to the skinned three-dimensional element is effectively ensured.

In some embodiments, when the element type of the target three-dimensional element is a static three-dimensional element, the above step 1032 may be implemented by performing the following processing for the static three-dimensional element: obtaining mesh data corresponding to the static three-dimensional element from a mesh sequence frame corresponding to a mesh renderer, where a coordinate system of the mesh data corresponding to the static three-dimensional element uses a position of the static three-dimensional element as an origin.

As an example, the static three-dimensional element may be an element of the three-dimensional elements other than the skinned three-dimensional element and the particle three-dimensional element. Because the renderer type of the renderer corresponding to the static three-dimensional element is the mesh renderer, the mesh data corresponding to the static three-dimensional element can be accurately obtained from the mesh sequence frame corresponding to the mesh renderer.

In this way, by obtaining the mesh data corresponding to the static three-dimensional element from the mesh sequence frame corresponding to the static renderer, the accuracy of the obtained mesh data corresponding to the static three-dimensional element is effectively ensured.

In some embodiments, when the element type of the target three-dimensional element is a particle three-dimensional element, the above step 1032 may be implemented by performing the following processing for the particle three-dimensional element: obtaining first mesh data corresponding to the particle three-dimensional element from a mesh sequence frame corresponding to a renderer run by a central processing unit; obtaining second mesh data corresponding to the particle three-dimensional element from a mesh sequence frame corresponding to a renderer run by a graphics processing unit; and determining the first mesh data and the second mesh data as mesh data corresponding to the particle three-dimensional element, where a coordinate system of the mesh data corresponding to the particle three-dimensional element uses a center point of a target canvas as an origin.

As an example, because the renderer type of the renderer corresponding to the particle three-dimensional element is a particle renderer, and the particle renderer includes the renderer run by the central processing unit and the renderer run by the graphics processing unit, the mesh data corresponding to the particle three-dimensional element can be obtained from the renderer run by the central processing unit and the renderer run by the graphics processing unit respectively.

Step 104. Transform the mesh data corresponding to the target three-dimensional element to obtain transformed mesh data, and create a transformed two-dimensional element corresponding to the target three-dimensional element through the transformed mesh data.

In some embodiments, the transformation may be matrix transformation, and the matrix transformation is used for dimensionally transforming a matrix form of the mesh data, thereby reducing the three-dimensional mesh data to two-dimensional mesh data.

In some embodiments, the transformed mesh data includes: first transformed mesh data based on an original coordinate system and second transformed mesh data based on a canvas coordinate system, where the canvas coordinate system uses a center point of a target canvas as an origin, and the original coordinate system uses a position of the transformed two-dimensional element as an origin.

Step 105. Render the at least one target two-dimensional element in the current frame, and render the transformed two-dimensional element corresponding to the target three-dimensional element in the current frame.

In some embodiments, because the coordinate system of the mesh data corresponding to the target three-dimensional element is not uniform, the coordinate system of the transformed mesh data obtained by transforming the mesh data corresponding to the target three-dimensional element is also not uniform, and the coordinate systems can be unified during creation of the transformed two-dimensional element or during rendition of the transformed two-dimensional element.

Two manners for unifying the coordinate systems are described below respectively.

Figure 3C:
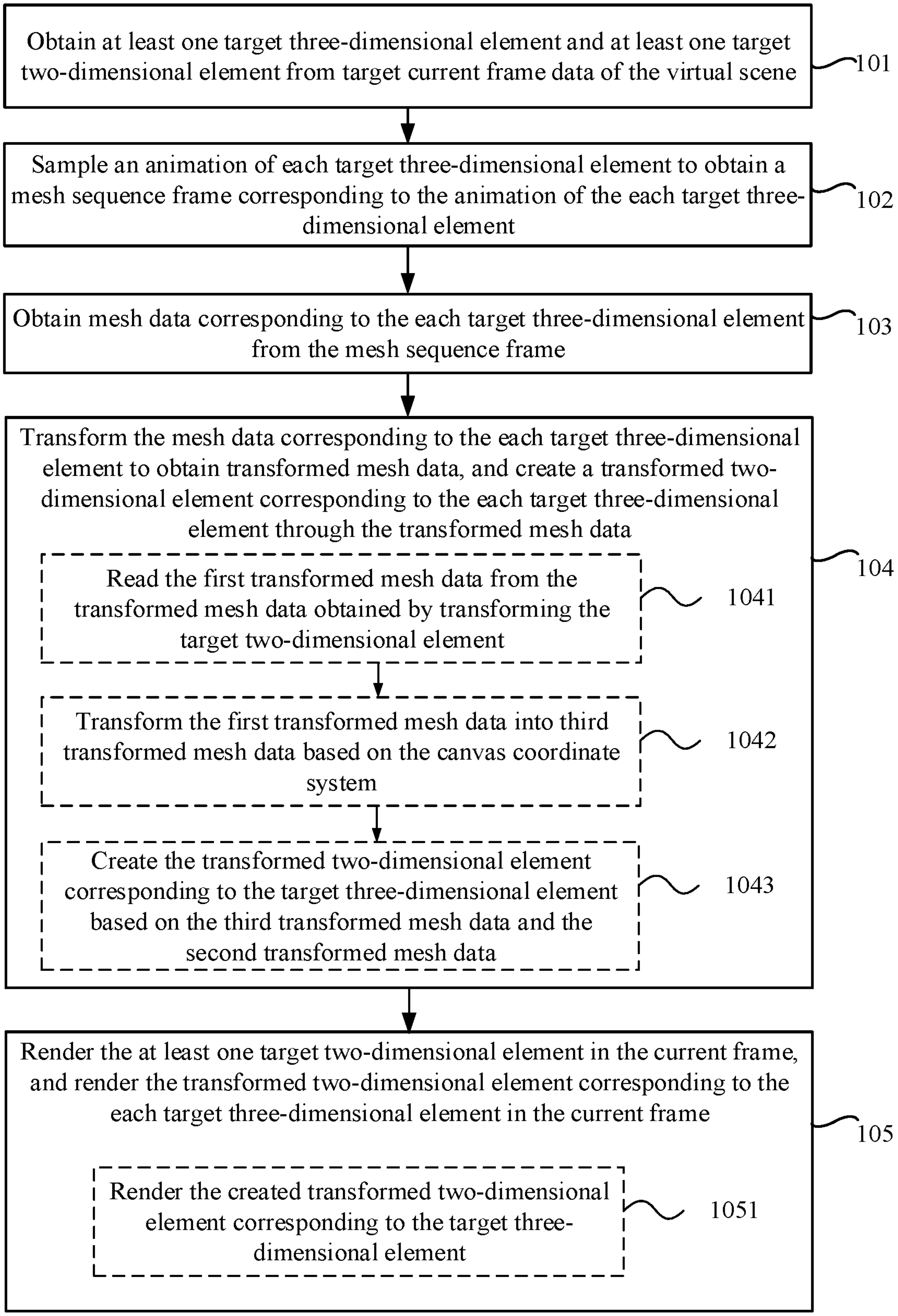

In some embodiments, the case of unifying the coordinate systems during creation of the transformed two-dimensional element is described. FIG. 3C is a schematic flowchart of a method for rendering a virtual scene according to an embodiment of this application. Step 104 shown in FIG. 3A may be implemented by performing step 1041 to step 1043 shown in FIG. 3C for any one target two-dimensional element. Descriptions are provided below respectively.

Step 1041. Read the first transformed mesh data from the transformed mesh data obtained by transforming the target two-dimensional element.

In some embodiments, the transformed mesh data includes first transformed mesh data based on an original coordinate system and second transformed mesh data based on a canvas coordinate system. Therefore, the first transformed mesh data and the second transformed mesh data can be read from the transformed mesh data.

Step 1042. Transform the first transformed mesh data into third transformed mesh data based on the canvas coordinate system.

In some embodiments, the first transformed mesh data includes at least one of the following: transformed translation data, transformed rotation data, and statically transformed mesh data. The transforming the first transformed mesh data into third transformed mesh data based on the canvas coordinate system in the above step 1042 may be implemented in the following manner: transforming, when the target three-dimensional element is a skinned three-dimensional element, transformed translation data based on the original coordinate system into transformed translation data based on the canvas coordinate system, and transforming transformed rotation data based on the original coordinate system into transformed rotation data based on the canvas coordinate system; and transforming, when the target three-dimensional element is a static three-dimensional element, statically transformed mesh data based on the original coordinate system into statically transformed mesh data based on the canvas coordinate system.

As an example, when the target three-dimensional element is a particle three-dimensional element, because the coordinate system of the mesh data corresponding to the particle three-dimensional element uses the center point of the target canvas as the origin, the transformed coordinate systems of the mesh data corresponding to the static three-dimensional element and the skinned three-dimensional element can be unified without transforming the coordinate system.

In this way, by unifying the coordinate systems of the transformed mesh data, the transformed two-dimensional element can be rendered in the same coordinate system, thereby effectively avoiding the disordered rendering effect caused by the disunity of the coordinate systems, and effectively improving the rendering effect.

Step 1043. Create the transformed two-dimensional element corresponding to the target three-dimensional element based on the third transformed mesh data and the second transformed mesh data.

As an example, because both the third transformed mesh data and the second transformed mesh data are based on the canvas coordinate system, the created coordinate systems of the transformed two-dimensional element are all based on the canvas coordinate system, thereby implementing the unification of the coordinate systems.

In some embodiments, the creating the transformed two-dimensional element in the above step 1043 may be implemented in the following manner: determining coordinates of the target three-dimensional element in the canvas coordinate system based on the third transformed mesh data and the second transformed mesh data; and creating a transformed two-dimensional element corresponding to the target three-dimensional element based on the coordinates and geometric features of the target three-dimensional element, where the geometric features characterize a geometric shape of the target three-dimensional element.

As an example, because both the third transformed mesh data and the second transformed mesh data are based on the canvas coordinate system, the coordinate of the target three-dimensional element in the canvas coordinate system can be determined based on the third transformed mesh data and the second transformed mesh data, and the coordinates of the target three-dimensional element in the canvas coordinate system can be determined, that is, the specific position of the target three-dimensional element in the canvas coordinate system can be determined. Further, based on the specific position of the target three-dimensional element in the canvas coordinate system and the geometric features of the target three-dimensional element, the transformed two-dimensional element corresponding to the target three-dimensional element is created, where the transformed two-dimensional element may be a projection of the target three-dimensional element on the canvas coordinate system.

Correspondingly, step 105 shown in FIG. 3A may be implemented by performing step 1051 shown in FIG. 3C. A description is provided below.

Step 1051. Render the created transformed two-dimensional element corresponding to the target three-dimensional element.

As an example, because the unification of the coordinate systems has been completed in the process of creating the transformed two-dimensional element in the above step 1041 to step 1043, in the process of rendering the transformed two-dimensional element in the above step 1051, the created transformed two-dimensional element corresponding to the target three-dimensional element can be directly rendered without unifying the coordinate systems.

Figure 3D:
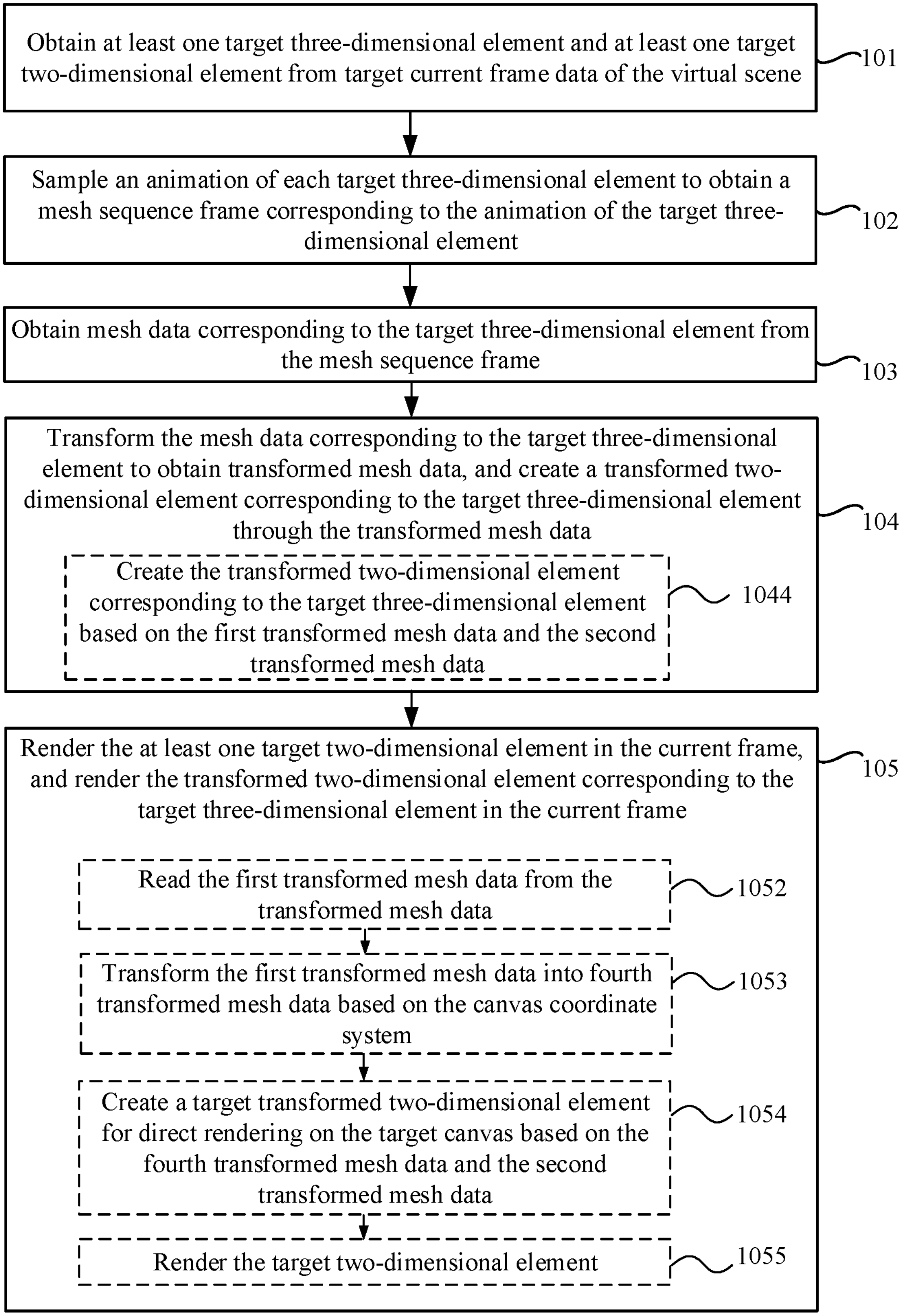

In some other embodiments, the case of unifying the coordinate systems during rendition of the transformed two-dimensional element is described. FIG. 3D is a schematic flowchart of a method for rendering a virtual scene according to an embodiment of this application. Step 104 shown in FIG. 3A may be implemented by performing step 1044 shown in FIG. 3D. A description is provided below.

Step 1044. Create the transformed two-dimensional element corresponding to the target three-dimensional element based on the first transformed mesh data and the second transformed mesh data.

As an example, because the coordinate systems are unified during rendition of the transformed two-dimensional element, the transformed two-dimensional element corresponding to the target three-dimensional element can be created directly based on the first transformed mesh data and the second transformed mesh data without unifying the coordinate systems during creation of the transformed two-dimensional element. In this case, because the first transformed mesh data is based on the original coordinate system and the second transformed mesh data is based on the canvas coordinate system, the created coordinate system of the transformed two-dimensional element corresponding to the target three-dimensional element is not uniform.

Correspondingly, step 105 shown in FIG. 3A may be implemented by performing step 1052 to step 1055 shown in FIG. 3D for any one transformed two-dimensional element. Descriptions are provided below respectively.

Step 1052. Read the first transformed mesh data from the transformed mesh data.

In some embodiments, the transformed mesh data includes the first transformed mesh data based on the original coordinate system and the second transformed mesh data based on the canvas coordinate system. Therefore, the first transformed mesh data and the second transformed mesh data can be read from the transformed mesh data.

Step 1053. Transform the first transformed mesh data into fourth transformed mesh data based on the canvas coordinate system.

As an example, because the first transformed mesh data is based on the original coordinate system, the fourth transformed mesh data based on the canvas coordinate system is obtained by transforming the coordinate system of the first transformed mesh data.

Step 1054. Create a to-be-rendered transformed two-dimensional element for direct rendering on the target canvas based on the fourth transformed mesh data and the second transformed mesh data; and As an example, because both the fourth transformed mesh data and the second transformed mesh data are based on the canvas coordinate system, the created coordinate systems of the transformed two-dimensional element are all based on the canvas coordinate system, thereby implementing the unification of the coordinate systems.

Step 1055. Render the target two-dimensional element.

In this way, by unifying the coordinate systems of the transformed mesh data, the target two-dimensional element can be rendered in the same coordinate system, thereby effectively avoiding the disordered rendering effect caused by the disunity of the coordinate systems, and effectively improving the rendering effect.

Figure 3E:
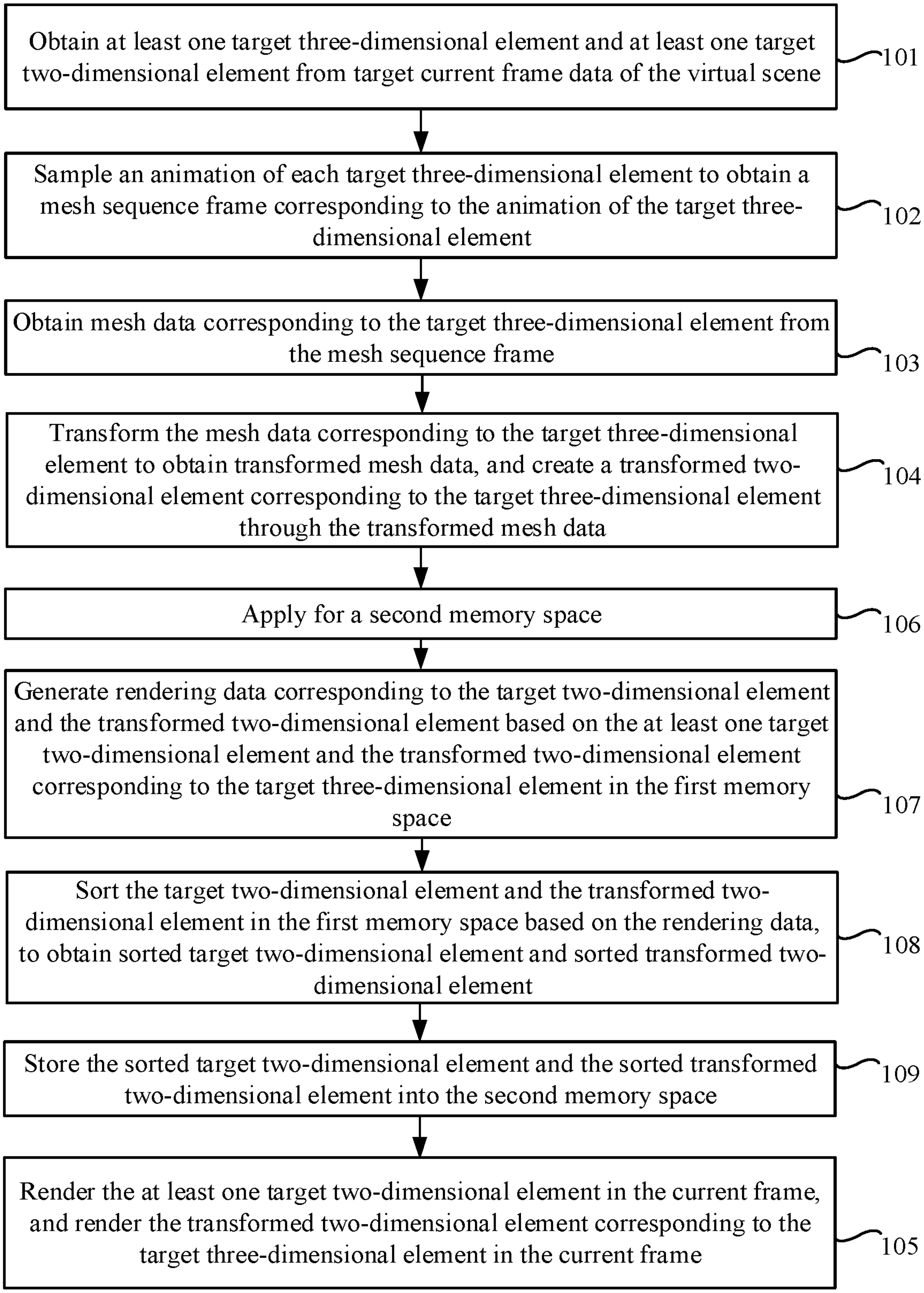

In some embodiments, FIG. 3E is a schematic flowchart of a method for rendering a virtual scene according to an embodiment of this application. Before step 105 shown in FIG. 3A is performed, the sorting of the target two-dimensional element and the transformed two-dimensional element may also be implemented by performing step 106 to step 109 shown in FIG. 3E. Descriptions are provided below respectively.

Step 106. Apply for a second memory space.

In some embodiments, the transformed two-dimensional element corresponding to the target three-dimensional element is stored in a first memory space.

In this way, by applying for the second memory space before sorting, the sorted target two-dimensional element and the sorted transformed two-dimensional element can be stored into the second memory space.

Step 107. Generate rendering data corresponding to the target two-dimensional element and the transformed two-dimensional element based on the at least one target two-dimensional element and the transformed two-dimensional element corresponding to the target three-dimensional element in the first memory space.

In some embodiments, the rendering data characterizes the rendering level of the element, so that by generating rendering data corresponding to the target two-dimensional element and the transformed two-dimensional element respectively, the target two-dimensional element and the transformed two-dimensional element in the first memory space can be sorted based on the rendering data.

Step 108. Sort the target two-dimensional element and the transformed two-dimensional element in the first memory space based on the rendering data, to obtain sorted target two-dimensional element and sorted transformed two-dimensional element.

In some embodiments, because the rendering data characterizes the rendering level of the element, the target two-dimensional element and the transformed two-dimensional element in the first memory space can be sorted according to the rendering levels of the target two-dimensional element and the to-be-rendered transformed two-dimensional element in the first memory space respectively, to obtain the sorted target two-dimensional element and the sorted transformed two-dimensional element.

Step 109. Store the sorted target two-dimensional element and the sorted transformed two-dimensional element into the second memory space.

Herein, the sorting may be used for determining the rendering order between elements.

In some embodiments, the following processing may also be performed for any one target two-dimensional element in the first memory space to determine the rendering order: determining a level relationship between the target two-dimensional element and other elements in the first memory space based on rendering data of the target two-dimensional element, where the other elements are two-dimensional elements in the first memory space other than the target two-dimensional element; and determining a rendering order between the target two-dimensional element and the other elements in the first memory space based on the level relationship, where the level relationship is positively related to the rendering order.

As an example, the level relationship between the target two-dimensional element and other elements in the first memory space is determined based on the rendering data of the target two-dimensional element. For example, when the level of the target two-dimensional element is the lowest level, the level relationship between the target two-dimensional element and the other elements in the first memory space is that the levels of the other elements in the first memory space are greater than the level of the target two-dimensional element; Based on the level relationship, the rendering order between the target two-dimensional element and other elements in the first memory space is determined. When the level of the target two-dimensional element is the lowest level, the other elements in the first memory space are first rendered, and finally the target two-dimensional element is rendered.

In some embodiments, before the above step 105 is performed, a three-dimensional rendering component for rendering the target three-dimensional element may also be disabled.

In this way, by disabling the three-dimensional rendering component for rendering the target three-dimensional element, the rendering disorder caused by mixed use of the three-dimensional rendering component and a two-dimensional rendering component is avoided.

In some embodiments, the above step 105 may be implemented in the following manner: calling a two-dimensional rendering component to render the sorted target two-dimensional element and the sorted transformed two-dimensional element in sequence according to the rendering order.

In this way, by disabling the three-dimensional rendering component for rendering the target three-dimensional element, calling the two-dimensional rendering component separately, and rendering the sorted target two-dimensional element and the sorted transformed two-dimensional element in sequence according to the rendering order, the mixed rendering effect of the two-dimensional element and the three-dimensional element is effectively ensured.

An exemplary application of the embodiments of this application in an actual game screen rendering application scenario is described below.

Referring to FIG. 4A, the animation of the virtual scene includes a plurality of sampling frames, and the two-dimensional element 12, the two-dimensional element 13, and the three-dimensional element 11 in the sampling frame 51, the sampling frame 52, and the sampling frame 53 shown in FIG. 4A change dynamically, that is, the positions of the two-dimensional element 12, the two-dimensional element 13, and the three-dimensional element 11 in the sampling frame 51, the sampling frame 52, and the sampling frame 53 are different. Specifically, in the sampling frame 52, the two-dimensional element 13 has been rendered correctly below the two-dimensional element 12, thereby implementing a level interlude between two two-dimensional elements. In the sampling frame 53, by calling a mask component of a game engine, it can be seen that the clipping effect of the two-dimensional element 13 is correct, indicating that the transformed two-dimensional element functions normally. The method for rendering a virtual scene provided in the embodiments of this application can effectively improve the mixed rendering effect of the two-dimensional element and the two-dimensional element.

Figure 4B:
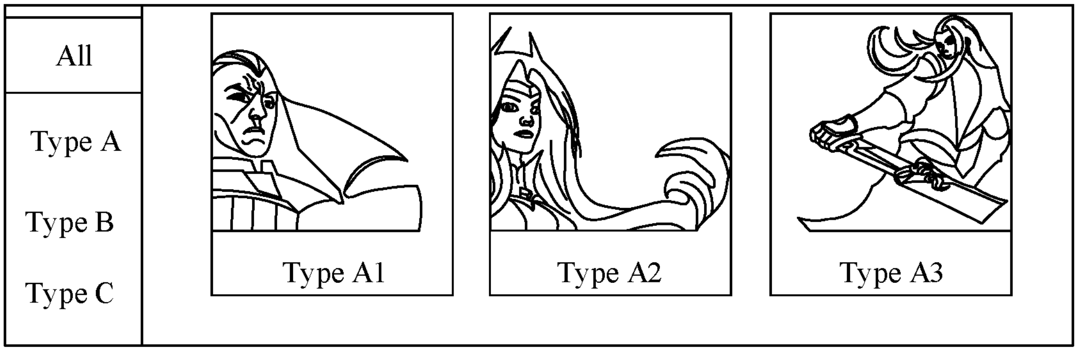
FIG. 4B is a schematic effect diagram of a method for rendering a virtual scene according to an embodiment of this application.

FIG. 4B is a schematic effect diagram of a method for rendering a virtual scene according to an embodiment of this application. In an actual game screen rendering application scenario, the mixed rendering of the two-dimensional element and the three-dimensional element in game objects of different types (type A1, type A2, and type A3) is implemented through the method for rendering a virtual scene provided in the embodiments of this application, thereby effectively improving the mixed rendering effect of the two-dimensional element and the three-dimensional element.

Figure 4C:
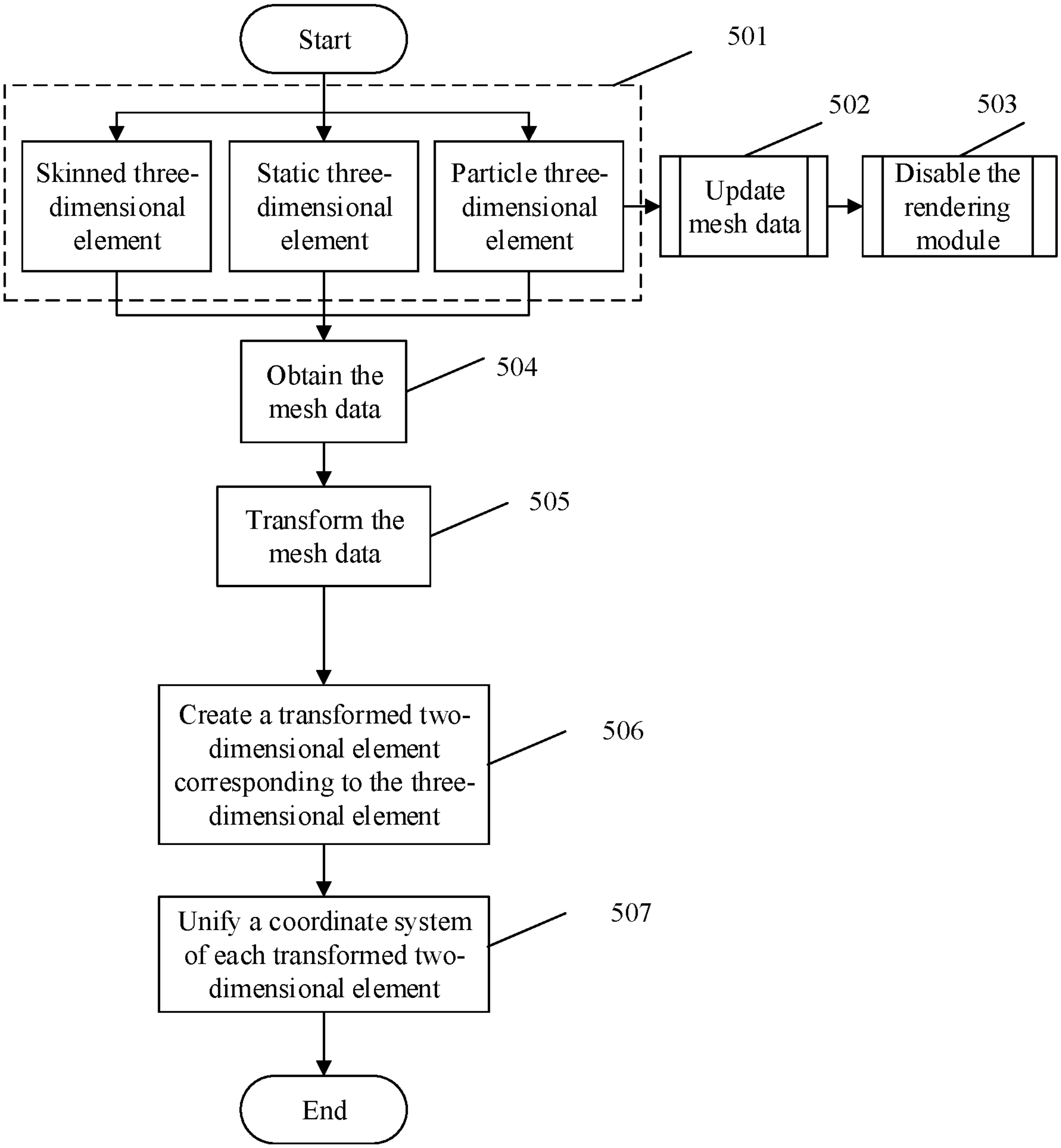
FIG. 4C is a schematic flowchart of a method for rendering a virtual scene according to an embodiment of this application.

In some embodiments, FIG. 4C is a schematic flowchart of a method for rendering a virtual scene according to an embodiment of this application. Descriptions are provided in combination with step 501 to step 507 shown in FIG. 4C.

Step 501. Obtain a skinned three-dimensional element, a static three-dimensional element, and a particle three-dimensional element.

As an example, at least one target three-dimensional element is obtained from the target current frame data of the virtual scene, where the target three-dimensional element includes a skinned three-dimensional element, a static three-dimensional element, and a particle three-dimensional element.

Step 502. Update mesh data.

As an example, because the three-dimensional element changes with the change of the animation of the virtual scene, mesh data corresponding to the skinned three-dimensional element, the static three-dimensional element, and the particle three-dimensional element is updated with the update of the animation of the virtual scene.

Step 503. Disable the rendering module.

As an example, the three-dimensional rendering component for rendering the target three-dimensional element is disabled, retaining only a logical update portion to update the mesh data.

Step 504. Obtain the mesh data.

As an example, the mesh data corresponding to the skinned three-dimensional element, the static three-dimensional element, and the particle three-dimensional element is obtained.

Figure 4D:
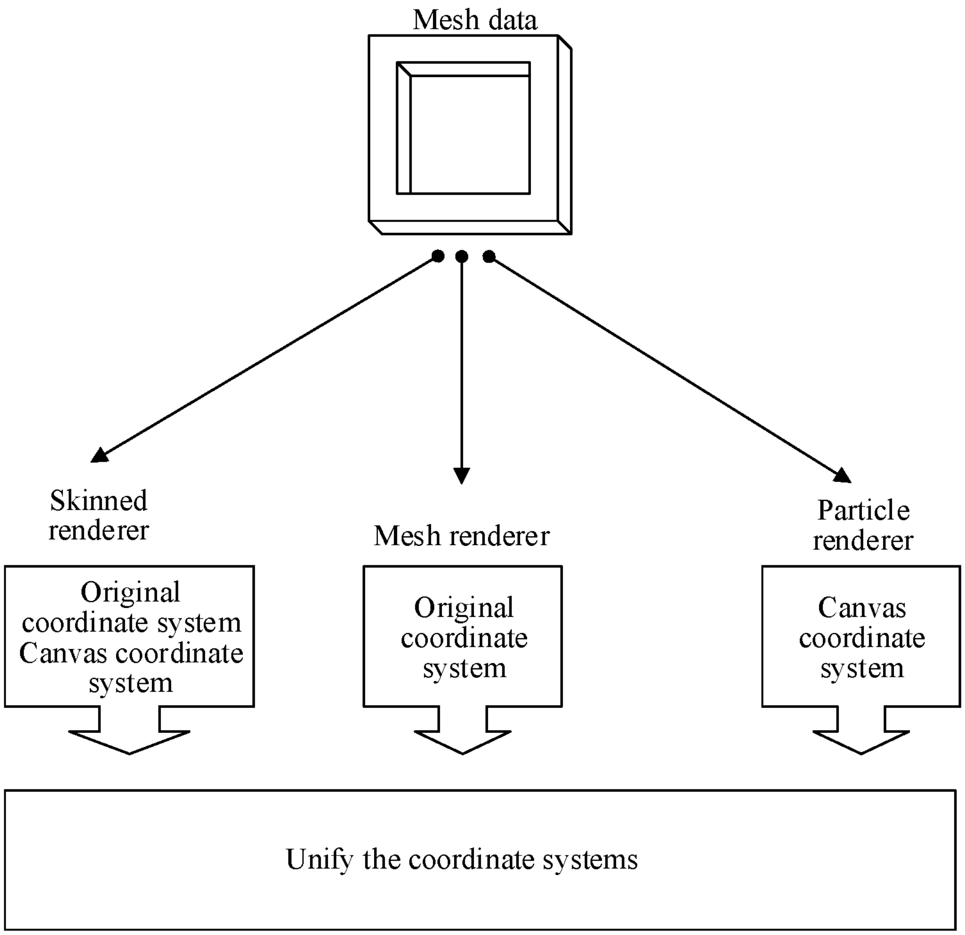

In some embodiments, FIG. 4D is a schematic principle diagram of a method for rendering a virtual scene according to an embodiment of this application. The process of obtaining the mesh data is described below with reference to FIG. 4D. When the element type of the target three-dimensional element is a skinned three-dimensional element, mesh data corresponding to the skinned three-dimensional element is obtained from a mesh sequence frame corresponding to a skinned renderer. A coordinate system of the mesh data corresponding to the skinned three-dimensional element may be a local coordinate system and a canvas coordinate system. The mesh data corresponding to the skinned three-dimensional element includes rotation data, translation data, and scaling data, a coordinate system of the rotation data and the translation data may be the local coordinate system, and a coordinate system of the scaling data may be the canvas coordinate system. When the element type of the target three-dimensional element is a static three-dimensional element, mesh data corresponding to the static three-dimensional element is obtained from a mesh sequence frame corresponding to a mesh renderer, and a coordinate system of the mesh data corresponding to the static three-dimensional element may be a local coordinate system. When the element type of the target three-dimensional element is a particle three-dimensional element, mesh data corresponding to the particle three-dimensional element may be obtained from a mesh sequence frame corresponding to a particle renderer, and a coordinate system of the mesh data corresponding to the particle three-dimensional element may be a canvas coordinate system.

Still referring to FIG. 4C, step 505. Transform the mesh data.

As an example, matrix transformation is performed on the mesh data corresponding to the skinned three-dimensional element, the static three-dimensional element, and the particle three-dimensional element, to obtain transformed mesh data.

Step 506. Create a transformed two-dimensional element corresponding to the three-dimensional element.

As an example, a transformed two-dimensional element corresponding to the target three-dimensional element is created based on the transformed mesh data.

Step 507. Unify a coordinate system of each transformed two-dimensional element.

As an example, referring to FIG. 4D, the unification of the coordinate systems is performed for the transformed two-dimensional element corresponding to the target three-dimensional element, so that the rendered transformed two-dimensional elements are in the same coordinate system.

The specific implementation of unifying the coordinate systems is described below in detail.

In some embodiments, the unification of the coordinate systems is completed in the process of creating the transformed two-dimensional element corresponding to the target three-dimensional element. First transformed mesh data is read from the transformed mesh data obtained by transforming the target three-dimensional element. The first transformed mesh data is transformed into third transformed mesh data based on the canvas coordinate system. The transformed two-dimensional element corresponding to the target three-dimensional element is created based on the third transformed mesh data and the second transformed mesh data.

As an example, the mesh data corresponding to the skinned three-dimensional element includes rotation data, translation data, and scaling data, and a coordinate system of the rotation data and the translation data may be a local coordinate system. That is, the first transformed mesh data is the rotation data and the translation data, the second transformed mesh data is the scaling data, the first transformed mesh data is transformed into third transformed mesh data based on the canvas coordinate system, and then a transformed two-dimensional element corresponding to the target three-dimensional element is created based on the third transformed mesh data and the second transformed mesh data.

In some other embodiments, the unification of the coordinate systems is completed in the process of rendering the transformed two-dimensional element corresponding to the target three-dimensional element in the current frame. First transformed mesh data is read from the transformed mesh data. The first transformed mesh data is transformed into fourth transformed mesh data based on the canvas coordinate system. A to-be-rendered transformed two-dimensional element for direct rendering on the target canvas is created based on the fourth transformed mesh data and the second transformed mesh data. The target two-dimensional element is rendered.

Figure 4E:
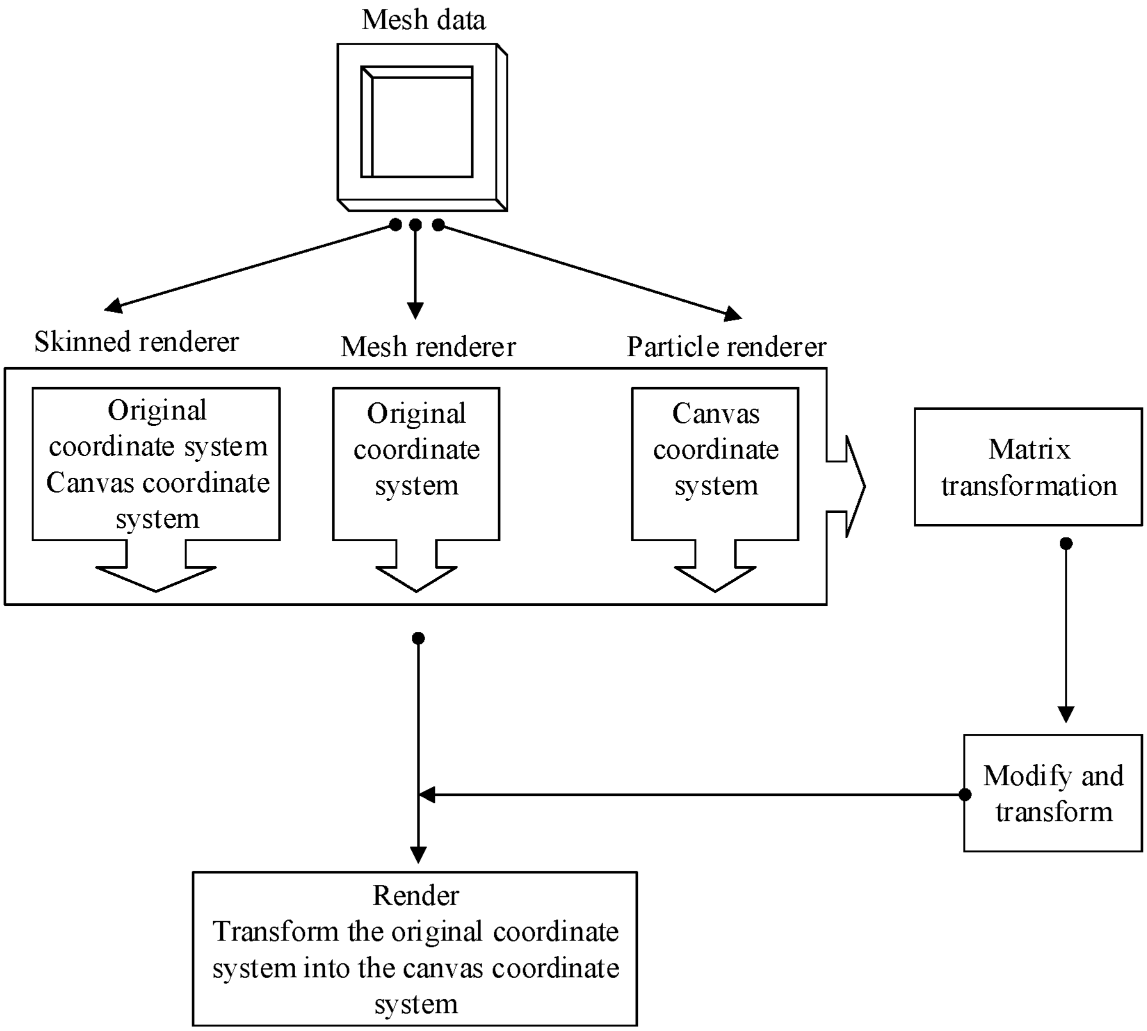

As an example, FIG. 4E is a schematic principle diagram of a method for rendering a virtual scene according to an embodiment of this application. The unification of the coordinate systems is completed in the process of rendering the transformed two-dimensional element corresponding to the target three-dimensional element in the current frame, and the original coordinate system is transformed into the canvas coordinate system. Matrix transformation is performed on the mesh data corresponding to the target three-dimensional element, and the matrix transformation result is modified and transformed.

In some embodiments, before the target two-dimensional element is rendered and the two-dimensional element is transformed, the rendering order may be determined in the following manner: First, a memory space (Prepare Output) is applied for in advance, and then corresponding rendering information data is generated according to an instruction set, and the rendering order between the target two-dimensional element and the transformed two-dimensional element is determined by sorting the target two-dimensional element and the transformed two-dimensional element based on the rendering information data.

In some embodiments, FIG. 4F and FIG. 4G are schematic principle diagrams of a method for rendering a virtual scene according to an embodiment of this application. FIG. 4F shows the time overhead in the related art, and FIG. 4G shows the time overhead of the method for rendering a virtual scene provided in the embodiments of this application. It can be seen that, the time overhead in the related art is 0.92 ms, and the total overhead of the central processing unit is 1.58 ms. In this application, the time overhead is obviously reduced from 0.92 ms to 0.02 ms, the total overhead of the central processing unit is reduced to 0.83 ms, and the performance is obviously improved.

In this way, through the method for rendering a virtual scene provided in the embodiments of this application, the barrier-free mixed use between the three-dimensional element and the two-dimensional element is implemented. While the mixed rendering effect of the two-dimensional element and the three-dimensional element can be effectively improved, the time overhead is effectively reduced, the development efficiency is improved, and the performance space for processing a more complex three-dimensional element is provided.

It can be understood that, relevant data such as current frame data is involved in the embodiments of this application. When the embodiments of this application are applied to specific products or technologies, the user permission or consent is required, and the acquisition, use, and processing of the relevant data need to comply with the relevant laws, regulations, and standards of relevant countries and regions.

The following continues to describe an exemplary structure in which the rendering apparatus 455 for a virtual scene provided in the embodiments of this application is implemented as software modules. In some embodiments, as shown in FIG. 2, the software modules stored in the rendering apparatus 455 for a virtual scene in the memory 440 may include: a first obtaining module 4551, configured to obtain at least one target three-dimensional element and at least one target two-dimensional element from target current frame data of the virtual scene; a sampling module 4552, configured to sample an animation of each target three-dimensional element to obtain a mesh sequence frame corresponding to the animation of the target three-dimensional element, the animation of the target three-dimensional element including the current frame and at least one historical frame, and each historical frame including the target three-dimensional element; a second obtaining module 4553, configured to obtain mesh data corresponding to the target three-dimensional element from the mesh sequence frame, different target three-dimensional elements corresponding to different coordinate systems of the mesh data; a transformation module 4554, configured to: transform the mesh data corresponding to the target three-dimensional element to obtain transformed mesh data, and create a transformed two-dimensional element corresponding to the target three-dimensional element through the transformed mesh data; and a rendering module 4555, configured to render the at least one target two-dimensional element in the current frame, and render the transformed two-dimensional element corresponding to the target three-dimensional element in the current frame.

In some embodiments, the second obtaining module 4553 is further configured to perform the following processing for any one target three-dimensional element: determining a renderer type of a renderer corresponding to an element type of the target three-dimensional element; and obtaining the mesh data corresponding to the target three-dimensional element from a mesh sequence frame corresponding to the renderer of the renderer type.

In some embodiments, the second obtaining module 4553 is further configured to perform, when the element type of the target three-dimensional element is a skinned three-dimensional element, the following processing for the skinned three-dimensional element: obtaining mesh data corresponding to the skinned three-dimensional element from a mesh sequence frame corresponding to a skinned renderer, where the mesh data corresponding to the skinned three-dimensional element includes translation data, rotation data, and scaling data, a coordinate system of the translation data and the rotation data uses a position of the skinned three-dimensional element as an origin, and a coordinate system of the scaling data uses a center point of a target canvas as an origin.

In some embodiments, the second obtaining module 4553 is further configured to perform, when the element type of the target three-dimensional element is a static three-dimensional element, the following processing for the static three-dimensional element: obtaining mesh data corresponding to the static three-dimensional element from a mesh sequence frame corresponding to a mesh renderer, where a coordinate system of the mesh data corresponding to the static three-dimensional element uses a position of the static three-dimensional element as an origin.

In some embodiments, the second obtaining module 4553 is further configured to perform, when the element type of the target three-dimensional element is a particle three-dimensional element, the following processing for the particle three-dimensional element: obtaining first mesh data corresponding to the particle three-dimensional element from a mesh sequence frame corresponding to a renderer run by a central processing unit; obtaining second mesh data corresponding to the particle three-dimensional element from a mesh sequence frame corresponding to a renderer run by a graphics processing unit; and determining the first mesh data and the second mesh data as mesh data corresponding to the particle three-dimensional element, where a coordinate system of the mesh data corresponding to the particle three-dimensional element uses a center point of a target canvas as an origin.

In some embodiments, the transformed mesh data includes: first transformed mesh data based on an original coordinate system, and second transformed mesh data based on a canvas coordinate system, where the canvas coordinate system uses a center point of a target canvas as an origin, and the original coordinate system uses a position of the transformed two-dimensional element as an origin; and the transformation module 4554 is further configured to perform the following processing for any one target three-dimensional element: reading the first transformed mesh data from the transformed mesh data obtained by transforming the target three-dimensional element; transforming the first transformed mesh data into third transformed mesh data based on the canvas coordinate system; and creating the transformed two-dimensional element corresponding to the target three-dimensional element based on the third transformed mesh data and the second transformed mesh data.

In some embodiments, the rendering module 4555 is further configured to render the created transformed two-dimensional element corresponding to the target three-dimensional element.

In some embodiments, the transformation module 4554 is further configured to: determine coordinates of the target three-dimensional element in the canvas coordinate system based on the third transformed mesh data and the second transformed mesh data; and create a transformed two-dimensional element corresponding to the target three-dimensional element based on the coordinates and geometric features of the target three-dimensional element, where the geometric features characterize a geometric shape of the target three-dimensional element.

In some embodiments, the first transformed mesh data includes at least one of the following: transformed translation data, transformed rotation data and statically transformed mesh data. The transformation module 4554 is further configured to: transform, when the target three-dimensional element is a skinned three-dimensional element, transformed translation data based on the original coordinate system into transformed translation data based on the canvas coordinate system, and transform transformed rotation data based on the original coordinate system into transformed rotation data based on the canvas coordinate system; and transform, when the target three-dimensional element is a static three-dimensional element, statically transformed mesh data based on the original coordinate system into statically transformed mesh data based on the canvas coordinate system.

In some embodiments, the transformed mesh data includes: first transformed mesh data based on an original coordinate system, and second transformed mesh data based on a canvas coordinate system, where the canvas coordinate system uses a center point of a target canvas as an origin, and the original coordinate system uses a position of the transformed two-dimensional element as an origin; and the transformation module 4554 is further configured to create the transformed two-dimensional element corresponding to the target three-dimensional element based on the first transformed mesh data and the second transformed mesh data.

In some embodiments, the rendering module 4555 is further configured to perform the following processing for any one transformed two-dimensional element: reading the first transformed mesh data from the transformed mesh data; transforming the first transformed mesh data into fourth transformed mesh data based on the canvas coordinate system; creating a to-be-rendered transformed two-dimensional element for direct rendering on the target canvas based on the fourth transformed mesh data and the second transformed mesh data; and rendering the to-be-rendered transformed two-dimensional element.

In some embodiments, the rendering apparatus 455 for a virtual scene further includes: a sorting module, configured to: apply for a second memory space; generate rendering data corresponding to the target two-dimensional element and the transformed two-dimensional element based on the at least one target two-dimensional element and the transformed two-dimensional element corresponding to the target three-dimensional element in the first memory space; sort the target two-dimensional element and the transformed two-dimensional element in the first memory space based on the rendering data, to obtain sorted target two-dimensional element and sorted transformed two-dimensional element; and store the sorted target two-dimensional element and the sorted transformed two-dimensional element into the second memory space, where the sorting is used for determining a rendering order between the elements.

In some embodiments, the rendering apparatus 455 for a virtual scene further includes: an order determining module, configured to perform the following processing for any one target two-dimensional element in the first memory space: determining a level relationship between the target two-dimensional element and other elements in the first memory space based on rendering data of the target two-dimensional element, where the other elements are two-dimensional elements in the first memory space other than the target two-dimensional element; and determining a rendering order between the target two-dimensional element and the other elements in the first memory space based on the level relationship, where the level relationship is positively related to the rendering order.

In some embodiments, the rendering apparatus 455 for a virtual scene further includes: a disabling module configured to disable a three-dimensional rendering component for rendering the target three-dimensional element; and the rendering module 4555 is further configured to call a two-dimensional rendering component to render the sorted target two-dimensional element and the sorted transformed two-dimensional element in sequence according to the rendering order.

In some embodiments, the sampling module 4552 is further configured to perform the following processing for any one target three-dimensional element: sampling the animation of the target three-dimensional element according to a sampling interval to obtain a plurality of sampling frames corresponding to the animation of the target three-dimensional element, where the number of the sampling frames is negatively correlated with a duration of the sampling interval; and determining the mesh sequence frame corresponding to the animation of the target three-dimensional element from the plurality of sampling frames, where the mesh sequence frame is a sampling frame including the target three-dimensional element in the plurality of sampling frames.

In some embodiments, the sampling module 4552 is further configured to: determine a start playing time and an end playing time of the target three-dimensional element in the animation of the target three-dimensional element; and determine the mesh sequence frame corresponding to the animation of the target three-dimensional element among the plurality of sampling frames based on the start playing time and the end playing time.

In some embodiments, the sampling module 4552 is further configured to: determine, when the start playing time and the end playing time are the same, one sampling frame at the same time among the plurality of sampling frames as the mesh sequence frame corresponding to the animation of the target three-dimensional element; and determine, when the start playing time and the end playing time are different, at least two sampling frames between the start playing time and the end playing time among the plurality of sampling frames as the mesh sequence frames corresponding to the animation of the target three-dimensional element.

An embodiment of this application provides a computer program product or computer program including computer instructions stored in a non-transitory computer-readable storage medium. A processor of a computer device reads the computer instructions from the computer-readable storage medium, and the processor executes the computer instructions so that the computer device performs the method for rendering a virtual scene in the embodiments of this application.

An embodiment of this application provides a non-transitory computer-readable storage medium storing executable instructions, the executable instructions, when executed by a processor, causing the processor to perform the method for rendering a virtual scene provided in the embodiments of this application, for example, the method for rendering a virtual scene shown in FIG. 3A.

In some embodiments, the computer-readable storage medium may be a memory such as FRAM, ROM, PROM, EPROM, EEPROM, flash memory, magnetic surface memory, optical disk, or CD-ROM; or may be various devices including one or any combination of the above memories.

In some embodiments, the executable instructions may be in the form of programs, software, software modules, scripts, or code, written in any form of programming language (including compiling or interpreting languages, or declarative or procedural languages), and may be deployed in any form, including being deployed as stand-alone programs or as modules, components, subroutines, or other units suitable for use in a computing environment.

By way of example, the executable instructions may, but do not necessarily correspond to a file in a file system, and may be stored as part of a file saving other programs or data, for example, stored in one or more scripts in a Hyper Text Markup Language (HTML) document, stored in a single file dedicated to the discussed program, or stored in a plurality of collaborative files (for example, files storing one or more modules, subroutines, or code portions).

As an example, the executable instructions may be deployed for execution on one computing device, or on a plurality of computing devices located at one location, or on a plurality of computing devices distributed at a plurality of locations and interconnected by a communication network.

In conclusion, the embodiments of this application have the following beneficial effects:

(1) By disabling the three-dimensional rendering component for rendering the target three-dimensional element, calling the two-dimensional rendering component separately, and rendering the sorted target two-dimensional element and the sorted transformed two-dimensional element in sequence according to the rendering order, the mixed rendering effect of the two-dimensional element and the three-dimensional element is effectively ensured.

(2) By disabling the three-dimensional rendering component for rendering the target three-dimensional element, the rendering disorder caused by mixed use of the three-dimensional rendering component and a two-dimensional rendering component is avoided.

(3) By applying for the second memory space before sorting, the sorted target two-dimensional element and the sorted transformed two-dimensional element can be stored into the second memory space.

(4) By unifying the coordinate systems of the transformed mesh data, the target two-dimensional element can be rendered in the same coordinate system, thereby effectively avoiding the disordered rendering effect caused by the disunity of the coordinate systems, and effectively improving the rendering effect.

(5) By unifying the coordinate systems of the transformed mesh data, the transformed two-dimensional element can be rendered in the same coordinate system, thereby effectively avoiding the disordered rendering effect caused by the disunity of the coordinate systems, and effectively improving the rendering effect.

(6) By obtaining the mesh data corresponding to the static three-dimensional element from the mesh sequence frame corresponding to the static renderer, the accuracy of the obtained mesh data corresponding to the static three-dimensional element is effectively ensured.

(7) By obtaining the mesh data corresponding to the skinned three-dimensional element from the mesh sequence frame corresponding to the skinned renderer, the accuracy of the obtained mesh data corresponding to the skinned three-dimensional element is effectively ensured.

(8) By determining the time when the target three-dimensional element appears and disappears in the animation, the start playing time and the end playing time of the target three-dimensional element are determined, thereby facilitating the subsequent accurate determination of the mesh sequence frame according to the start playing time and the end playing time.

(9) Mesh data corresponding to target three-dimensional elements is transformed, and then transformed two-dimensional elements corresponding to the target three-dimensional elements are created according to the transformed mesh data, thereby implementing the transformation of the target three-dimensional elements, and further rendering the target two-dimensional elements and the transformed two-dimensional elements. In this way, the target three-dimensional elements are transformed to obtain the transformed two-dimensional elements, and the transformed two-dimensional elements and the target two-dimensional elements are rendered to implement the effective adaptation between the target two-dimensional elements and the target three-dimensional elements, and implement the unification of the rendering modes of the target three-dimensional elements and the target two-dimensional elements, to retain the rendering effect of the target three-dimensional elements, thereby effectively improving the mixed rendering effect of the two-dimensional elements and the three-dimensional elements.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. The foregoing descriptions are merely embodiments of this application and are not intended to limit the protection scope of this application. Any modification, equivalent replacement, or improvement made without departing from the spirit and principle of this application shall fall within the protection scope of this application.

What is claimed is:

1. A method for rendering a virtual scene performed by an electronic device, the method comprising:

obtaining a target animation including a plurality of frames, wherein at least a first frame of the plurality of frames includes a plurality of target three-dimensional elements in the virtual scene and at least a second frame of the plurality of frame does not include the plurality of target three-dimensional elements, wherein the plurality of target three-dimensional elements have at least two different element types;

sampling the target animation to obtain a plurality of mesh sequence frames including the plurality of target three-dimensional elements, the plurality of mesh sequence frames comprising a current frame and at least one historical frame, and each historical frame comprising the plurality of target three-dimensional elements;

obtaining mesh data corresponding to the plurality of target three-dimensional elements from the plurality of mesh sequence frames;

creating a plurality of transformed two-dimensional elements corresponding to the plurality of target three-dimensional elements through transforming the mesh data corresponding to the plurality of target three-dimensional elements, further including:

performing matrix transformation on the mesh data corresponding to the plurality of target three-dimensional elements into at least first transformed mesh data based on an original coordinate system and second transformed mesh data based on a canvas coordinate system, wherein the canvas coordinate system uses a center point of a target canvas as an origin, and the original coordinate system uses a position of the transformed two-dimensional element as an origin;

creating a transformed two-dimensional element corresponding to each of the plurality of target three-dimensional elements from the first transformed mesh data and the second transformed mesh data, respectively, wherein different transformed two-dimensional elements have different coordinate systems; and unifying the different coordinate systems of the plurality of transformed two-dimensional elements into one unified coordinate system; and rendering the plurality of transformed two-dimensional elements corresponding to the plurality of target three-dimensional elements in the current frame in the unified coordinate system.

2. The method according to claim 1, wherein the obtaining mesh data corresponding to the plurality of target three-dimensional elements from the mesh sequence of frames comprises:

for each of the plurality of target three-dimensional elements:

determining a renderer type of a renderer corresponding to an element type of the target three-dimensional element; and obtaining the mesh data corresponding to the target three-dimensional element from at least one of the plurality of mesh sequence frames corresponding to the renderer of the renderer type.

3. The method according to claim 2, wherein the obtaining the mesh data corresponding to the target three-dimensional element from at least one of the plurality of mesh sequence frames corresponding to the renderer of the renderer type comprises:

when the element type of the target three-dimensional element is a skinned three-dimensional element:

obtaining mesh data corresponding to the skinned three-dimensional element from a mesh sequence frame corresponding to a skinned renderer, wherein the mesh data corresponding to the skinned three-dimensional element comprises translation data, rotation data, and scaling data, a coordinate system of the translation data and the rotation data uses a position of the skinned three-dimensional element as an origin, and a coordinate system of the scaling data uses a center point of a target canvas as an origin.

4. The method according to claim 2, wherein the obtaining the mesh data corresponding to the target three-dimensional element from at least one of the plurality of mesh sequence frames corresponding to the renderer of the renderer type comprises:

when the element type of the target three-dimensional element is a static three dimensional element:

obtaining mesh data corresponding to the static three-dimensional element from a mesh sequence frame corresponding to a mesh renderer, wherein a coordinate system of the mesh data corresponding to the static three-dimensional element uses a position of the static three-dimensional element as an origin.

5. The method according to claim 2, wherein the obtaining the mesh data corresponding to the target three-dimensional element from at least one of the plurality of mesh sequence frames corresponding to the renderer of the renderer type comprises:

when the element type of the target three-dimensional element is a particle three-dimensional element:

obtaining first mesh data corresponding to the particle three-dimensional element from a mesh sequence frame corresponding to a renderer run by a central processing unit;

obtaining second mesh data corresponding to the particle three-dimensional element from a mesh sequence frame corresponding to a renderer run by a graphics processing unit; and determining the first mesh data and the second mesh data as mesh data corresponding to the particle three-dimensional element, wherein a coordinate system of the mesh data corresponding to the particle three-dimensional element uses a center point of a target canvas as an origin.

6. The method according to claim 1, wherein the creating the transformed two-dimensional element corresponding to each of the plurality of target three-dimensional elements from the first transformed mesh data and the second transformed mesh data comprises:

transforming the first transformed mesh data into third transformed mesh data based on the canvas coordinate system;

determining coordinates of the target three-dimensional element in the canvas coordinate system based on the third transformed mesh data and the second transformed mesh data; and creating a transformed two-dimensional element corresponding to the target three-dimensional element based on the coordinates and geometric features of the target three-dimensional element, wherein the geometric features characterize a geometric shape of the target three-dimensional element.

7. The method according to claim 1, wherein the plurality of transformed two-dimensional elements corresponding to the plurality of target three-dimensional elements are stored in a first memory space; and before the rendering the plurality of transformed two-dimensional elements corresponding to the plurality of target three-dimensional elements in the current frame in the unified coordinate system, the method further comprises:

applying for a second memory space;

generating rendering data corresponding to each of the plurality of transformed two-dimensional elements based on the transformed two-dimensional element corresponding to the target three-dimensional element in the first memory space;

sorting the plurality of transformed two-dimensional elements in the first memory space based on the rendering data; and storing the plurality of transformed two-dimensional elements into the second memory space, wherein the sorting is used for determining a rendering order between the elements.

8. The method according to claim 1, wherein the sampling the target animation to obtain a mesh sequence of frames including the target three-dimensional element, comprises:

sampling the target animation according to a sampling interval to obtain a plurality of sampling frames, wherein the number of the sampling frames is negatively correlated with a duration of the sampling interval;

determining a start playing time and an end playing time of the target three-dimensional element in the target animation; and determining the mesh sequence of frames including the target three-dimensional element among the plurality of sampling frames based on the start playing time and the end playing time.

9. The method according to claim 8, wherein the determining a start playing time and an end playing time of the target three-dimensional element in the animation of the target three-dimensional element comprises:

when the start playing time and the end playing time are the same, determining one sampling frame among the plurality of sampling frames as a mesh sequence frame corresponding to the animation of the target three-dimensional element; and when the start playing time and the end playing time are different, determining at least two sampling frames between the start playing time and the end playing time among the plurality of sampling frames as the mesh sequence of frames corresponding to the animation of the target three-dimensional element.

10. An electronic device, comprising:

a memory, configured to store executable instructions; and a processor, configured to execute the executable instructions and cause the electronic device to implement a method for rendering a virtual scene including:

obtaining a target animation including a plurality of frames, wherein at least a first frame of the plurality of frames includes a plurality of target three-dimensional elements in the virtual scene and at least a second frame of the plurality of frame does not include the plurality of target three-dimensional elements, wherein the plurality of target three-dimensional elements have at least two different element types;

sampling the target animation to obtain a plurality of mesh sequence frames including the plurality of target three-dimensional elements, the plurality of mesh sequence frames comprising a current frame and at least one historical frame, and each historical frame comprising the plurality of target three-dimensional elements;

obtaining mesh data corresponding to the plurality of target three-dimensional elements from the plurality of mesh sequence frames;

creating a plurality of transformed two-dimensional elements corresponding to the plurality of target three-dimensional elements through transforming the mesh data corresponding to the plurality of target three-dimensional elements, further including:

performing matrix transformation on the mesh data corresponding to the plurality of target three-dimensional elements into at least first transformed mesh data based on an original coordinate system and second transformed mesh data based on a canvas coordinate system, wherein the canvas coordinate system uses a center point of a target canvas as an origin, and the original coordinate system uses a position of the transformed two-dimensional element as an origin;

creating a transformed two-dimensional element corresponding to each of the plurality of target three-dimensional elements from the first transformed mesh data and the second transformed mesh data, respectively, wherein different transformed two-dimensional elements have different coordinate systems; and unifying the different coordinate systems of the plurality of transformed two-dimensional elements into one unified coordinate system; and rendering the plurality of transformed two-dimensional elements corresponding to the plurality of target three-dimensional elements in the current frame in the unified coordinate system.

11. The electronic device according to claim 10, wherein the obtaining mesh data corresponding to the plurality of target three-dimensional elements from the mesh sequence of frames comprises:

for each of the plurality of target three-dimensional elements:

determining a renderer type of a renderer corresponding to an element type of the target three-dimensional element; and obtaining the mesh data corresponding to the target three-dimensional element from at least one of the plurality of mesh sequence frames corresponding to the renderer of the renderer type.

12. The electronic device according to claim 11, wherein the obtaining the mesh data corresponding to the target three-dimensional element from at least one of the plurality of mesh sequence frames corresponding to the renderer of the renderer type comprises:

when the element type of the target three-dimensional element is a skinned three-dimensional element:

obtaining mesh data corresponding to the skinned three-dimensional element from a mesh sequence frame corresponding to a skinned renderer, wherein the mesh data corresponding to the skinned three-dimensional element comprises translation data, rotation data, and scaling data, a coordinate system of the translation data and the rotation data uses a position of the skinned three-dimensional element as an origin, and a coordinate system of the scaling data uses a center point of a target canvas as an origin.

13. The electronic device according to claim 11, wherein the obtaining the mesh data corresponding to the target three-dimensional element from at least one of the plurality of mesh sequence frames corresponding to the renderer of the renderer type comprises:

when the element type of the target three-dimensional element is a static three-dimensional element:

obtaining mesh data corresponding to the static three-dimensional element from a mesh sequence frame corresponding to a mesh renderer, wherein a coordinate system of the mesh data corresponding to the static three-dimensional element uses a position of the static three-dimensional element as an origin.

14. The electronic device according to claim 11, wherein the obtaining the mesh data corresponding to the target three-dimensional element from at least one of the plurality of mesh sequence frames corresponding to the renderer of the renderer type comprises:

when the element type of the target three-dimensional element is a particle three-dimensional element:

obtaining first mesh data corresponding to the particle three-dimensional element from a mesh sequence frame corresponding to a renderer run by a central processing unit;

obtaining second mesh data corresponding to the particle three-dimensional element from a mesh sequence frame corresponding to a renderer run by a graphics processing unit; and determining the first mesh data and the second mesh data as mesh data corresponding to the particle three-dimensional element, wherein a coordinate system of the mesh data corresponding to the particle three-dimensional element uses a center point of a target canvas as an origin.

15. The electronic device according to claim 10, wherein the creating the transformed two-dimensional element corresponding to each of the plurality of target three-dimensional elements from the first transformed mesh data and the second transformed mesh data comprises:

transforming the first transformed mesh data into third transformed mesh data based on the canvas coordinate system;

determining coordinates of the target three-dimensional element in the canvas coordinate system based on the third transformed mesh data and the second transformed mesh data; and creating a transformed two-dimensional element corresponding to the target three-dimensional element based on the coordinates and geometric features of the target three-dimensional element, wherein the geometric features characterize a geometric shape of the target three-dimensional element.

16. The electronic device according to claim 10, wherein the plurality of transformed two-dimensional elements corresponding to the plurality of target three-dimensional elements are stored in a first memory space; and before the rendering the plurality of transformed two-dimensional elements corresponding to the plurality of target three-dimensional elements in the current frame in the unified coordinate system, the method further comprises:

applying for a second memory space;

generating rendering data corresponding to each of the plurality of transformed two-dimensional elements based on the transformed two-dimensional element corresponding to the target three-dimensional element in the first memory space;

sorting the plurality of transformed two-dimensional elements in the first memory space based on the rendering data; and storing the plurality of transformed two-dimensional elements into the second memory space, wherein the sorting is used for determining a rendering order between the elements.

17. The electronic device according to claim 10, wherein the sampling the target animation to obtain a plurality of mesh sequence frames including the target three-dimensional element, comprises, comprises:

sampling the target animation according to a sampling interval to obtain a plurality of sampling frames, wherein the number of the sampling frames is negatively correlated with a duration of the sampling interval;

determining a start playing time and an end playing time of the target three-dimensional element in the target animation; and determining the mesh sequence of frames including the target three-dimensional element among the plurality of sampling frames based on the start playing time and the end playing time.

18. The electronic device according to claim 17, wherein the determining a start playing time and an end playing time of the target three-dimensional element in the animation of the target three-dimensional element comprises:

when the start playing time and the end playing time are the same, determining one sampling frame among the plurality of sampling frames as the mesh sequence frame corresponding to the animation of the target three-dimensional element; and when the start playing time and the end playing time are different, determining at least two sampling frames between the start playing time and the end playing time among the plurality of sampling frames as the mesh sequence frames corresponding to the animation of the target three-dimensional element.

19. A non-transitory computer-readable storage medium, storing executable instructions, the executable instructions, when executed by a processor of an electronic device, causing the electronic device to implement a method for rendering a virtual scene including:

obtaining a target animation including a plurality of frames, wherein at least a first frame of the plurality of frames includes a plurality of target three-dimensional elements in the virtual scene and at least a second frame of the plurality of frame does not include the plurality of target three-dimensional elements, wherein the plurality of target three-dimensional elements have at least two different element types;

sampling the target animation to obtain a plurality of mesh sequence frames including the plurality of target three-dimensional elements, the plurality of mesh sequence frames comprising a current frame and at least one historical frame, and each historical frame comprising the plurality of target three-dimensional elements;

obtaining mesh data corresponding to the plurality of target three-dimensional elements from the plurality of mesh sequence frames;

creating a plurality of transformed two-dimensional elements corresponding to the plurality of target three-dimensional elements through transforming the mesh data corresponding to the plurality of target three-dimensional elements, further including:

performing matrix transformation on the mesh data corresponding to the plurality of target three-dimensional elements into at least first transformed mesh data based on an original coordinate system and second transformed mesh data based on a canvas coordinate system, wherein the canvas coordinate system uses a center point of a target canvas as an origin, and the original coordinate system uses a position of the transformed two-dimensional element as an origin;

creating a transformed two-dimensional element corresponding to each of the plurality of target three-dimensional elements from the first transformed mesh data and the second transformed mesh data, respectively, wherein different transformed two-dimensional elements have different coordinate systems; and unifying the different coordinate systems of the plurality of transformed two-dimensional elements into one unified coordinate system; and rendering the plurality of transformed two-dimensional elements corresponding to the plurality of target three-dimensional elements in the current frame in the unified coordinate system.

20. The non-transitory computer-readable storage medium according to claim 19, wherein the obtaining mesh data corresponding to the plurality of target three-dimensional elements from the mesh sequence of frames comprises:

for each of the plurality of target three-dimensional elements:

determining a renderer type of a renderer corresponding to an element type of the target three-dimensional element; and obtaining the mesh data corresponding to the target three-dimensional element from at least one of the plurality of mesh sequence frames corresponding to the renderer of the renderer type.

21. The non-transitory computer-readable storage medium according to claim 19, wherein the creating the transformed two-dimensional element corresponding to each of the plurality of target three-dimensional elements from the first transformed mesh data and the second transformed mesh data comprises:

transforming the first transformed mesh data into third transformed mesh data based on the canvas coordinate system;

determining coordinates of the target three-dimensional element in the canvas coordinate system based on the third transformed mesh data and the second transformed mesh data; and creating a transformed two-dimensional element corresponding to the target three-dimensional element based on the coordinates and geometric features of the target three-dimensional element, wherein the geometric features characterize a geometric shape of the target three-dimensional element.

* * * * *